(12) United States Patent
Chandler

(10) Patent No.: US 7,473,363 B2
(45) Date of Patent: Jan. 6, 2009

(54) ORGANIC WASTE TREATMENT

(75) Inventor: Ross Chandler, Victoria (AU)

(73) Assignee: Advanced Environmental Technologies Pty Ltd. (AU)

(*) Notice: Subject to any disclaimer, the term of this patent is extended or adjusted under 35 U.S.C. 154(b) by 361 days.

(21) Appl. No.: 10/492,465

(22) PCT Filed: Oct. 17, 2002

(86) PCT No.: PCT/AU02/01411

§ 371 (c)(1),
(2), (4) Date: Aug. 5, 2004

(87) PCT Pub. No.: WO03/033418

PCT Pub. Date: Apr. 24, 2003

(65) Prior Publication Data

US 2004/0251197 A1    Dec. 16, 2004

(30) Foreign Application Priority Data

Oct. 17, 2001    (AU)    ................... PR 8333

(51) Int. Cl.
C02F 3/00    (2006.01)
(52) U.S. Cl. .............. 210/606; 210/610; 210/611
(58) Field of Classification Search ......... 210/610–611, 210/606
See application file for complete search history.

(56) References Cited

U.S. PATENT DOCUMENTS

| | | | | |
|---|---|---|---|---|
| 5,015,385 A | | 5/1991 | Becker .................. | 210/610 |
| 5,527,465 A | * | 6/1996 | Dickerson .............. | 210/620 |
| 6,060,046 A | | 5/2000 | Steinberg et al. ....... | 424/78.09 |
| 6,129,104 A | * | 10/2000 | Ellard et al. ............ | 137/3 |
| 6,455,031 B1 | * | 9/2002 | Davies et al. .......... | 424/54 |
| 2002/0037260 A1 | * | 3/2002 | Budny et al. .......... | 424/49 |

FOREIGN PATENT DOCUMENTS

| | | |
|---|---|---|
| AU | 753329 | 10/2002 |
| CN | 1195649 | 10/1998 |
| CN | 1273946 | 11/2000 |
| CN | 1287976 | 3/2001 |
| EP | 0 236 989 B1 | 11/1990 |

(Continued)

OTHER PUBLICATIONS

"Procedures for Chemical Waste Disposal," Chemical and Laboratory Safety, Cornell University, published at http://www.ehs.cornell.edu/chem_lab_safety/chem_manual.cfm (Dec. 2000), downloaded from web on Mar. 3, 2008.*

(Continued)

Primary Examiner—Chester T Barry
(74) Attorney, Agent, or Firm—Woodcock Washburn LLP

(57) ABSTRACT

A method of treatment of sewage comprising adding at least one cell signalling chemical (CSC) to a sewage substrate, wherein the at least one CSC regulates activity of a microbial population in the sewage substrate. In particular, methods of reducing odor in sewage treatment systems, preventing corrosion in sewage treatment systems, enhancing microbial digestion of sewage, managing methane gas production in a sewage treatment system, enhancing digestion of sewage sludge, resuscitating dormant microbes or microbes that are in a starvation or stationary phase in a sewage substrate and controlling the bacteria responsible for oxidation or reduction of nitrogenous compounds in a sewage substrate, are provided.

46 Claims, 10 Drawing Sheets

FOREIGN PATENT DOCUMENTS

| | | |
|---|---|---|
| EP | 0 650 931 A2 | 5/1995 |
| JP | 63242393 | 10/1988 |
| JP | 6233994 | 8/1994 |
| JP | 2001252686 | 9/2001 |

OTHER PUBLICATIONS

Graphic attachment to "Ithaca—Wastewater Treatment Process" showing process performance, http://www.ci.ithaca.ny.us/vertical/Sites/{5DCEB23D-5BF8-4AFF-806D-68E7C14DEB0D}/uploads/{3B0224F4-EE1A-4A2C-9668-5315F0740E18}.JPG (undated), downloaded Mar. 4, 2008.*

"Ithaca—Wastewater Treatment Process," http://www.cityofithaca.org/index.asp?Type=B_BASIC&SEC={D02CB1EB-06A9-4F31-AB8F-D47922E38C06}&DE={2FE0E75D-6F65-4EF9-847B-7273512DA5C7}, (undated), downloaded Mar. 4, 2008.*

Derwent Abstract Accession No. 94-307284/38. Abstract of JP-A-06233994, Aug. 23, 1994.

Derwent Abstract Accession No. 2002-003153/01. Abstract of JP-A-2001252686, Sep. 18, 2001.

Derwent Abstract Accession No. 88-327514/46. Abstract of JP-A-63242393, Oct. 7, 1988.

Derwent Abstract Accession No. 87-2582383/37. Abstract of EP-236989, Sep. 16, 1987.

Biological Abstracts Accession No. 199800501362. Buchenauer, H., "Biological control of soil-borne diseases by rhizobacteria," *Zeitschrift-fuer-Pflanzenkrankheiten-und-Pflanzenschutz*, Jul. 1998, 105(4):329-348 Abstract, 1 page.

Salmond, G. P. C. et al., "The bacterial 'enigma': cracking the code of cell-cell communication," *Mol Microbiol*, May 1995, 16(4): 615-24.

Kleerebezem, M. et al., "Quorum sensing by peptide pheromones and two-component signal-transduction systems in Gram-positive bacteria," *Mol Microbiol*, Jun. 1997, 24(5): 895-904.

Lazazzera, B. et al., "The ins and outs of peptide signaling," *Trends Microbiol*, Jul. 1998, 6(7): 288-94.

de Nys, R. et al., "Cross-talk in bacterial extracellular signalling systems," *Microbial Biosystems: New Frontiers, Proceedings of the 8th International Symposium on Microbial Ecology*, Bell, Brylinsky, Johnson-Green (Ed), Atlantic Canada Society for Microbial Ecology, Halifax, Canada, 1999, 6 pages.

Kazlauskas, R. et al., "A new class of halogenated lactones from the red alga *Delisea fimbriata*," *Tetrahedron Letters*, 1997, No. 1, pp. 37-40.

* cited by examiner

ORGANIC WASTE TREATMENT

The present invention relates to a method of modifying the activity of microbial populations at the cellular level, in sewage, by the addition of at least one cell signalling chemical.

The decomposition of sewage is a significant problem on a global basis. The increasing trend towards urbanisation is a factor responsible for the concentration of sewage in localised areas.

Sewage treatment plants are generally located away from population centres. With expanding urbanisation, the distance and the retention time of the sewage, in the sewerage catchment system before it reaches the sewage treatment plant for processing is increased. Long retention times and high temperatures create major problems within the sewerage catchment system as the sewage turns septic. Septic sewage is malodorous and difficult to process at sewage treatment plants (STP). This is in part due to high sulfide levels inhibiting normal microbial activity associated with the decomposition of sewage. This gives rise to effluent waters that are not adequately digested and therefore comprise a high organic fraction. Such effluent waters are potential health and environmental pollution hazards.

Septic sewage produces offensive odours such as the odour associated with hydrogen sulfide gas (rotten egg gas) and other malodorous gaseous substances. These odours, as well as being offensive, are toxic at specific concentrations. High levels of dissolved sulfide's (for example HS or $H_2S$) within the sewage arriving at the STP must be oxidised to sulfates (for example $SO_4$ or $H_2SO_4$) increasing the energy requirements for oxidation. High levels of dissolved sulfides also inhibit sewage digestion by aerobic and anaerobic methane-forming bacteria and therefore may inhibit a significant component of the sewage decomposition process, which may result in high sludge volumes.

In environments such as sewerage catchment systems, hydrogen sulfide gas is formed as a result of the microbial activity of sulfur reducing bacteria (equation 1 and 2).

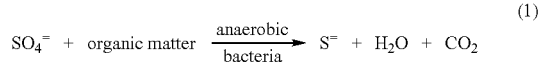

(1)

$$SO_4^= + \text{organic matter} \xrightarrow[\text{bacteria}]{\text{anaerobic}} S^= + H_2O + CO_2$$

(2)

$$S^= + 2H^+ \longrightarrow H_2S$$

Another group of bacteria may then convert the sulfides to sulfates, thereby producing sulfuric acid (equation 3).

(3)

$$H_2S + 2O_2 \xrightarrow[\text{bacteria}]{\text{anaerobic}} + H_2SO_4$$

The formation of sulfuric acid causes major corrosion problems (for example equation 4) in sewerage catchment networks and sewage treatment plants. Corrosion resulting from sulfuric acid is a major cause of infrastructure failure and degradation within these networks and plants.

(4)

$$H_2SO_4 + CaCO_3 \longrightarrow CaSO_4 + H_2O + CO_2$$

Chemicals may be used to suppress both odour and corrosion in sewerage systems. Other chemicals may also be used to improve processing of sewage. Examples of such chemicals include acid or alkali for pH control, disinfectants, biocides, antibiotics, surfactants, deodorants, fragrances, chelating agents, oxidising compounds and oxygen gas.

Some chemical processes are reliant on a chemical reaction occurring to reduce odour, corrosion or microbial activity, while other chemicals may be used to kill bacteria or specific groups of bacteria. Alternatively nutrients may be added to improve the environment of specific groups of bacteria, so that they are then able to out-compete less desirable bacteria. Chemical buffering agents are used to improve sewage process while deodorants mask, absorb or react with odours.

In general, the suppression of odour and/or corrosion requires the addition of large amounts of chemicals, many of which increase the salt levels within the sewage effluent. Oxygen or oxidising compounds may be used to stimulate aerobic bacteria, facultative anaerobes and other aerobic micro-organisms and thereby out-compete the sulfur reducing bacteria for the same food source.

There is a need for simple and effective methods of treating sewage to reduce or prevent the difficulties outlined above.

A number of naturally occurring chemicals are known to regulate the behaviour of individual microbes or their communication with other microbes within a population. These chemicals are called Cell Signalling Chemicals (CSC's). CSC's are diffusible signal molecules that act via microbial cell surfaces or intracellular receptors to modulate gene expression. The CSC's are not bactericides or antibiotics and do not cause lysis of the bacteria cells. Similarly CSC's are not nutrient additions that may be added to overcome a nutrient deficiency that may regulate microbial numbers.

Specific concentrations of CSC's are known to produce a range of responses in prokaryotic cells, for example, auto-regulation, stimulation of slow-growing or dormant microbes, quorum sensing, virulence, swarming, biofilm formation, increases or decreases in reproduction and increases or decreases in metabolic activity. The fundamental difference between CSC's and other chemicals used in microbial control is that the CSC's manipulate microbial response via communication signals at the cellular level. These CSC's are responsible for switching on, or switching off specific gene expression at specific signal strengths. CSC's do not kill bacteria nor do they provide essential nutrients to enhance or diminish the response of specific microbes. CSC's are either up regulate (speed up) or down regulate (slow down), diminish or disrupt the communication signals between the bacteria. This down regulation may even force the bacteria to revert from a biofilm state to a planktonic (single cell or free floating phenotype) state. Conversely CSC's may up regulate (strengthen) the microbial communication signals. This increased signal strength can be used to cause planktonic bacteria to increase their reproduction and metabolic rate and thus exploit the food resource available. The increased cell signal strength (CSC) may also cause the planktonic bacteria to proliferate, attach to surfaces, form microcolonies, quorum sense and form mature biofilms.

The response of a specific species of bacteria to a specific CSC and its signal strength is transient, if that specific signal and its strength are not maintained. Both the signal strength and signal type are important in the maintenance of specific gene expression. If the specific signal and signal strength are not maintained, the stimulated gene will return to its non-stimulated state within varied periods of time, generally ranging from minutes to hours. CSC's rapidly decompose in the environment and thus must be continually generated at specific signal concentrations to elicit specific microbial responses.

Different microbes respond to different cell signalling chemicals at different chemical cell signal strengths. For example, gram negative bacteria respond to N-acyl homoserine lactones, while gram positive bacteria respond to specific peptide pheromones, generally histidine kinases via a two component signal transduction system. The role of CSC's has previously been observed in a range of laboratory experiments and they have been used in the suppression of formation of biofilms in marine environments. Such experiments and uses are described in Kleerebezem M, Quandri L E N, Kuipers O P abd deVos W M. "Quorum sensing by peptide pheromones and two-component signal-transduction system in Gram-positive bacteria" *Molecular Microbiology*, 1997, Vol 24 No. 5, pp 895-904; de Nys R, Rice S, Manefield M, Kjelleberg S, et al. "Cross talk in bacterial extracellular signals". *Microbial Biosystems: New Frontiers. Proceedings of the 8th International Symposium on Microbial Ecology*. Bell C R, Brylinsky, Johnson-Green P (ed)., *Atlantic Canada Society for Microbial Ecology*, Halifax, Canada 1999; Lazazzera B A, Grossman A D "The ins and outs of peptide signalling" *Trends Microbiol.*, 1998 July:6(7):288-94; Salmond G P, Bycroft B W, Stewart G S, Williams P "The bacterial 'enigma': cracking the code of cell to cell communication" *Mol Microbiol.*, 1996 February;19(3):649; Buchenauer H. "Biological control of soil-bourne diseases by rhizobacteria" *Zeitschrift-fuer-Pfanzenkrankheiten und Pflanzenschultz*, July, 1998;105(4)329-384; Kazlauskas R, Murphy P T, Quinn R J. Wells R J "A new class of halogenated lactones from the red algae Delisea fimbriata (Bonnemaisoniaceae)" (1977) *Tet. Lett.* 1: 37-40; Antifouling Compositions, Steinberg et al U.S. Pat. No. 6,060,046, 9 May 2000.

The present invention relates to the use of CSC's to manipulate, mediate, or regulate the communication signals between species or populations of bacteria in sewage, the sewerage catchment environment or the STP. This enhances or disrupts the normal way in which bacteria communicate with each other. Using this technology, cell signals that cause swarming, quorum sensing and the formation of biofilms may be disrupted. This disruption may cause the bacteria to resume a planktonic state and substantially down regulate their activity. Alternatively, other signals or signal strengths can be used to initiate or strengthen the cell signals that cause resuscitation, swarming, increased metabolic activity and reproduction rates, quorum sensing and the formation of biofilms. Advantageously, the CSC's may be used in very small quantities to elicit a desired response.

In one embodiment, the present invention provides a method of treatment of sewage comprising:

adding at least one cell signalling chemical to a sewage substrate, wherein the at least one cell signalling chemical regulates activity in at least one microbial population in the sewage substrate.

The activity of a microbial population may be modified or regulated by manipulating single microbes within a population, by controlling the level of intra or inter cellular signalling chemicals. Alternatively, the activity of a microbial population may be modified or regulated by manipulating a colony or population of microbes by controlling the level of intercellular signalling chemicals within the medium. Specific microbial activities that may be manipulated by CSC's include cell to cell communication, quorum sensing, swarming, bacterial motility, symbiotic associations with multicellular organisms, cell metabolic rates, production of metabolic products, cell division and conjunction, cell resuscitation, formation of biofilm communities, entry into a stationary or dormant phase, discrete and diverse metabolic processes in concert with cell density, bioluminescence and the production of antibiotics, surfactants and enzymes.

The term "cell signalling chemicals" (CSC's) refers to chemicals that are capable of manipulating the behaviour of a specific microbial population or populations through intra- or extra-cellular signals in or between prokaryotic cells. At specific CSC strengths, a specific species of microbe, responds to the signal at an intracellular level through gene expression. These signals are generally used to assist a specific species of microbe to maximise its exploitation of a resource. Different CSC's may also mimic, block, inhibit or interfere with the communication signals between specific microbes or populations of microbes. For example, the cell signalling chemicals may act by binding to cell surface receptors and inhibiting or blocking other CSC's thereby modifying communication between microbes in a population. This type of CSC generally diminishes a specific microbial response or a population's response and reduces their ability to exploit a resource. CSC's are also responsible for regulating microbial activity by mediating cross talk between microbes. Cross talk appears important in mitigating starvation and stationary phase responses and in resuscitation of dormant or stationary bacteria.

As used herein, the term "up regulate" refers to the use of at least one CSC at sufficient signal strength to cause a proliferation in microbial activity of at least one species of microbe (an increase in either or both the metabolic and reproduction rate of bacteria), the coordination of individual microbial functioning resulting in the possible formation of an attachment layer on surfaces, the possible formation of microcolonies, possible quorum sensing and the formation of mature biofilms.

As used herein the term "down regulate" refers to the use of at least one CSC at sufficient signal strength to cause a reduction in microbial activity (a decrease in either or both the metabolic and reproduction rate of bacteria), the possible breakdown and dispersement of the bacteria forming the microbial attachment layer on surfaces, the possible breakdown and dispersement of at least some species of bacteria forming microcoloines, a reduction in quorum sensing by at least some species of bacteria and at least a reduction in some microbial species forming the biofilm. In many cases, down regulate will mean the destruction of biofilm complex, with the individual bacteria or bacteria species returning to a planktonic state while remaining viable and culturable. Down regulation may result from a decrease in signal strength, from interference with the signals or existing signals, or from competition for the signal receptor sites on the bacteria.

The term "cross talk" as used herein refers to induced microbial reactions to a range of CSC signals and/or signal strengths. Different pheromone and furanone signals and/or signal strengths are used to signal or disrupt the signals between individual members of a bacterial population (same species) or community (different species). Cross talk is important in strengthening or interfering with the communication network of competing bacteria. Cross talk enhances or diminishes the up or down regulation of bacteria and thus strengthens or diminishes a microbial population or community's ability to exploit a resource. Cross talk is also important in preventing bacteria from entering the starvation or stationary phase and also in resuscitation.

It is particularly useful in the processing of sewage to modify the activity of microbial populations to stimulate microbes that decompose organic waste and inhibit or down regulate the activity of microbes that produce toxic and malodorous gases such as sulfides, greenhouse gases such as methane or corrosive by-products such as sulfuric acid. It is also useful to inhibit microbial populations that form biofilms that support sulfur reducing bacteria in specific locations, such as in the sewerage catchment pipes.

Specific CSC's, controlling pheromones, for example, furanones and antimicrobial peptides, when applied to a sewerage catchment at specific concentrations may be used to down regulate bacteria, swarming and prevent the subsequent formation of biofilms without the use of introduced products such as biocides that cause lyses of bacterial cells. Furanones and antimicrobial peptides may be used to cause the bacteria to disassociate, slough or remain in their planktonic (single cell) state. This is of particular importance in the control of odour associated with sulfur reducing and other odour forming bacteria. In their planktonic state, sulfur reducing bacteria will produce only about one thousandth of the level of sulfides that they are capable of producing in their biofilm state.

High levels of dissolved sulfides arriving at the head of works at the STP, interfere with sewage processing. Minimizing the production of sulfides in the sewerage catchment though the use of CSC's, means that only very low levels of sulfides will arrive at the STP and these will not have a significant adverse impact on the sewage treatment process. Low levels of sulfides in the catchment will minimize the high levels of corrosion normally associated with odorous sewage.

Specific CSC's, stimulating pheromones, for example, N-acyl homoserine lactone peptide and specific histidine protein kinase pheromones are particularly useful in the processing of sewage. At specific dose rates, they are used among other things, to up regulate or stimulate the metabolic and reproduction rate of either or both aerobic and anaerobic bacteria and thereby enhance the decomposition of sewage. By controlling the microbial populations, such factors as the level of aerobic and anaerobic decomposition and even the level of methane gas (a greenhouse gas) produced can be controlled.

CSC's typically include bacterial pheromones, eukaryotic hormones and diffusible communication molecules or their derivatives. CSC's may be naturally occurring or may be synthetic. Bacterial pheromones include compounds such as N-acyl homoserine lactones (AHL's), pheromone peptides including histidine protein kinases, N-acetylated, C-amidated D-amino acid hexapeptides, D-amino acid peptides including D-tyrosine and/or D-isoleusine, cyclic dipeptides, hydrophobic tyramines, lipopeptide biosurfactants, fatty acid derivatives, antimicrobial peptides and furanones, such as halogenated, hydroxylated or alkyl furanones. CSC's may also be Eukaryotic hormones including auxins, for example, indole-3-acetic acid, cytokinins or cytokines with cytokinin activity such as 6-(γγdimethylallylamino)purine, zeatin and 6-benzylamino-purine, ethylene gas, gibberellins and abscisic acid. Diffusible communication molecules are derived from plant, animal, algal or microbial sources and have a cell signalling function or synthetic derivatives of these compounds. Other useful CSC compounds are Rhodomine 123 and 3-hydroxypalmitic acid methyl ester.

Furanones that are useful in the present invention include 4-acetoxy-2,5-dimethyl-3(2H)-furanone, 4-hydroxy-5-methyl-3(2H)-furanone, 4-hydroxy-2,5-dimethyl-3(2H)-furanone, 4-hydroxy-2-ethyl-5-methyl-3(2H)-furanone, 4-hydroxy-5-ethyl-2-methyl-3(2H)-furanone, 4-hydroxy-5-methyl-3(2H)-furanone, 4-methoxy-2,5-dimethyl-3(2H)-furanone, 4-ethoxy-2,5-dimethyl-3(2H)-furanone, 4-butyroxy-2,5-dimethyl-3(2H)-furanone, 4-hydroxy-2,5-dimethyl-3(2H)-furanone, (S)-(+)-5-hydroxymethyl-2(5H)-furanone, (R)-dihydro-3-hydroxy-2(3H)-furanone, (S)-dihydro-3-hydroxy-2(3H)-furanone, (R)-dihydro-4-hydroxy-2(3H)-furanone, (R)-dihydro-5-(hydroxymethyl)-2(3H)-furanone, 3-chloro-4-(bromochloromethyl)-5-hydroxy-2(5H)-furanone, 3-chloro-4-(dibromomethyl)-5-hydroxy-2(5H)-furanone, 3-bromo-4-(dibromomethyl)-5-hydroxy-2(5H)-furanone, 3-chloro-4-(dichloromethyl)-5-hydroxy-2(5H)-furanone and 3-chloro-4-(dichloromethyl)-2(5H)-furanone. Acetyl homoserine lactones (AHL) include N-(3-oxohexanoyl)-L-homoserine lactone (OHHL), N-butanoyl-L-homoserine lactone (BHL), N-hexanoyl-L-homoserine lactone (HHL), butyryl homoserine lactone, hydroxybutyryl homoserine lactone, octanoyl homoserine lactone, 3-oxooctanoyl homoserine lactone, 3R-hydroxy-7-cis-tetradecenoyl homoserine lactone and 3-oxododecanoyl homoserine lactone. Suitable histidine protein kinases include groups HPK 1a, HPK 1ai, HPK 1b, HPK 1c, HPK 2a, HPK 2b, HPK 2c, HPK 3a, HPK 3b, HPK 3c, HPK 3d, HPK 3e, HPK 3f, HPK 3g, HPK 3h, HPK 3i, HPK 4, HPK 5, HPK 6, HPK 7, HPK 8, HPK 9, HPK 10 and HPK 11.

Pheromones are small molecules secreted by one individual prokaryote and received by a second individual of the same species in which they signal a specific action. At specific signal strengths (chemical concentrations) the bacteria may swarm, quorum sense and form biofilms. Conversely, if the signal strength diminishes, the bacteria may dissociate, slough off and resume their planktonic state. Pheromones are positive signals that up or down regulate the microbial response.

Furanones by contrast are signal blockers. That is, substances that compete with the pheromones for the same signal site, or block the pheromone signal in some other way. At specific signal strengths, a furanone can prevent at least one species of bacteria from forming a colony or it can cause the demise of colonies by interrupting the normal pheromone communication between the bacteria.

There are many pheromone and furanone signals and cross talk between the bacteria appears prevalent. Pheromones appear to be important in territory marking, with specific pheromone signals at specific strengths eliciting specific responses in the species of bacteria and thus allowing one species to out compete another species for an environmental niche. Furanones, at low signal strengths, appear to have a role in the mitigation of starvation and stationary phases, probably by interrupting the pheromone signals that are telling the bacteria to enter a starvation or stationary phase.

Microbial populations that may be manipulated by the methods of the invention include gram positive bacteria, gram negative bacteria, cyanobacteria, autotrophic bacteria (photosynthetic and chemoautotrophic), heterotrophic bacteria and nitrogen-fixing bacteria. The invention is also useful in manipulating populations of aerobes, facultative anaerobes and anaerobes; and is particularly useful in manipulating populations of bacteria that produce malodorous gas, including hydrogen sulfide gas (produced by sulfur and sulfate reducing bacteria), and bacteria that convert sulfide to sulfate. The invention is also useful in manipulating ammonia forming, nitrite forming, nitrate forming, denitrifying and methane forming bacterial populations.

In one embodiment of the invention, the activity of Gram negative bacteria is enhanced or inhibited by the addition of at least one CSC. At least one CSC is added to a sewage substrate, for example, an N-acylated homoserine lactone, at a specific dose rate to regulate, enhance, initiate and/or sustain specific functioning levels of microbial activity including quorum sensing, swarming and biofilm production. Conversely, at least one other CSC, for example, a halogenated furanone, may be added to a sewage substrate at a specific dose rate to down regulate functions such as swarming and biofilm attachment. Specific furanones at specific dose rates are used to interfere with the interspecies communication and this causes dissemination of biofilms, sloughing and the maintenance of bacteria in their planktonic state.

In another embodiment of the invention, the activity of Gram positive bacteria is enhanced or inhibited by the addition of at least one CSC. In this embodiment, the at least one specific CSC is a peptide pheromone that activates the histidine protein kinases receptor of a two component signal transduction system. Specific dose rates of the at least one CSC are used to up or down regulate, enhance or diminish, initiate and/or sustain specific functioning levels of microbial activity, such as swarming, quorum sensing and biofilm production. Other CSC's, for example antimicrobial peptides and furanones, that inhibit the histidine protein kinase response regulator two component signal transduction pathway, are used at specific dose rates to disrupt the pheromone peptide signals and thus down regulate the effect of swarming and biofilm attachment. Such peptides include N-acetylated D-amino acid hexapeptides. Specific furanones at specific dose rates interfere with the interspecies communication and thus cause the dissemination of biofilms, sloughing and the maintenance of bacteria in their planktonic state.

In another aspect of the invention, the at least one CSC may impact on histidine kinase protein receptors (signal receivers) or on the domains of the response regulator proteins controlling phosphorylation or de-phosphorylation of the regulatory domains. The phosphorylated response either stimulates or represses the transcription of specific genes. However, the phosphorylated response is transient with the response regulator returning to the non-stimulated state within a varied period of time, for example, between a few seconds and a few hours. To maintain the desired state, it is important to maintain the at least one CSC at sufficient signal strength to obtain the desired signal response.

In another aspect of the invention, the at least one CSC may down regulate the swrA gene and hence reduce the production of lipoprotein biosurfactant required for swarming.

In another aspect of the invention the at least one CSC may be a cyclic dipeptide which may interfere with acylated homoserine lactones (AHLs) by competing with the AHLs for the bacteria's binding sites.

In yet another aspect, the at least one CSC may be a furanone applied at a non-growth inhibitory concentration, that will minimise or eliminate the impact of stress resistance, senescence, or lack of culturability arising from carbon starvation. The at least one CSC may also contain a supernatant solution used in combination with the furanone to protect against the loss of culturability arising from carbon or other stresses.

In another aspect, at least one furanone (CSC) may be added to interfere with interspecies communication during swarming of mixed cultures. This will reduce the production of serrawettin W2 that is essential for the surface translocation of the differentiated swarm cells.

In another aspect, the at least one CSC can be used to control exoenzyme production and/or Harpin$_{Ecc}$ production or control the genes responsible for post-transcriptional regulation and therefore control changes in the phenotype or phenotype expression.

In yet another aspect of the invention, the at least one CSC is used to control specific microbial gene expression. There is an array of different gene expressions, which may be enhanced or diminished through the use of specific CSC's and or signal strengths. These include but are not limited to luminescence, the production of toxins, antibiotics, enzymes, polysaccharides and surfactants. Microbially produced enzymes and microbially produced surfactants, or the lack of these products, play an important role in sewage transport or digestion. Toxins and antibiotics are more territory markers and thus also play a role in specific species microbial dominance. Thus by controlling gene expression through the use of the at least one CSC, the microbial dominance can be changed as well as the products produced by that dominance and hence the rate of sewage digestion.

In another aspect, the at least one CSC can be used to interfere with the genes responsible for the formation and/or signal strength of 3-oxydodecanoyl HSL and/or butryl HSL. The production of 3-oxydodecanoyl HSL (a CSC) by at least some microbes is important in regulating the polysaccharide production required to cause adhesion of biofilms to at least some surfaces. Butryl HSL appears responsible in at least some microbes for polysaccharide production, which is required in the formation of biofilms. Hence 3-oxydodecanoyl HSL and/or butryl HSL appear to be important in the formation and/or attachment of biofilms for at least some microbes. Interfering with these signals or signal strengths is important in minimising biofilm attachment and/or the formation of biofilms.

In another aspect, the at least one CSC may be a mimic of the bacterial pheromone or alternatively it may initiate the gene response initiated by the bacterial pheromone. That is, the mimic will provide extracellular signals that will elicit the same responses as the bacterial pheromone when applied to a media at specific concentrations.

In another aspect, the at least one CSC may be a mimic of a bacterial furanone. The mimic, when applied to sewage at specific concentrations will provide the extracellular signals that will elicit the same responses as the bacterial furanone in the sewage.

In another aspect, the concentration of the at least one CSC (signal strength) will be a critical factor in the activation of specific receptor proteins that will initiate specific gene expression.

Sewage includes both carbonaceous and nitrogenous waste matter. Carbonaceous waste includes compounds containing carbon and hydrogen atoms and may include other atoms, such as oxygen, nitrogen, sulfur and phosphorus. Nitrogenous waste includes compounds containing nitrogen atoms and other atoms such as hydrogen, carbon and oxygen. Nitrogenous waste includes urea, uric acid, ammonia, nitrates and nitrites. Sewage includes populations of many different microbes, including aerobes, facultative anaerobes and anaerobes.

Sewage has a variable composition which depends on the substances being discharged into the sewerage catchment network. Furthermore, the flow rate of sewage in the sewerage catchment network is variable and this determines the retention time of the sewage in the sewerage catchment network. For example, at night, the amount of sewage entering the sewerage catchment network is low and flow rates tend to be slow. In the daytime, more sewage enters the sewerage catchment network, and its composition may vary as industrial waste products may be discharged into the network as well as human waste. Furthermore, as greater amounts of waste are discharged into the sewerage catchment network, the flow rate of the sewage increases.

The dosage levels of CSC's required will depend on the volume, flow rate, Biochemical Oxygen Demand (BOD)/Chemical Oxygen Demand (COD) loading and bacterial composition of the sewage substrate. The bacterial composition of a sewage substrate may be determined using standard plate counts for bacterial species or types. The dosage level of CSC's required may be determined by assessing bacterial composition, volume and flow rate, therefore, dosage levels may vary over a treatment period, for example, a 24 hour period.

Typically the CSC's may be added to the sewage substrate at a dosage level of between 1 nanogram/liter or kilogram of sewage and 1 gram/liter or kilogram of sewage. Furanones are effective at preventing biofilm formation or adhesion in sewerage catchment pipes in the range of 2.5 μg/m$^2$ to 25 g/m$^2$.

One or more CSC may be added to a sewage substrate. A single CSC at specific signal strength or concentration may modify the behaviour of a single population (phenotype expression) of microbes in the sewage substrate or it may independently modify the behaviour (phenotype expression) of more than one population of microbes in the sewage substrate. Alternatively, a mixture of CSC's may be added to a sewage substrate that may together modify the behaviour of a single population of microbes, or may independently modify the behaviour of more than one population of microbes in the sewage substrate. A mixture of CSC's may be added so that a second CSC supplements or complements the activity of a first CSC. For example, by enhancing a response or preventing feedback inhibition, which may otherwise desensitise a microbial cell's activity to the first CSC.

Alternatively, furanones and antimicrobial peptides (CSC's) may be added to sewage in a catchment to prevent swarming and the colonization of surfaces by biofilms. These CSC's may be specific or general in their application in maintaining bacteria in their planktonic state. Additional specific CSC's at specific concentrations (signal strengths) may be added to the sewage to mediate the starvation and stationary phase responses. This cross talking between various bacterial signals (CSC's) and CSC signal strengths can be maintained during the transit phase of the sewage in the sewerage catchment pipes. On arrival of the sewage at the head of works at the STP, different signals or signal strengths can be used to modify the microbial population in such a way as to rapidly accelerate aerobic or anaerobic sewage digestion (decomposition), depending on the design requirements at the STP.

Advantageously, the at least one CSC may be added to the sewage substrate in a composition comprising a growth promoting media that supports or enhances the growth of desirable microbes in the sewage substrate leading to an increased rate of decomposition. Such growth promoting media may contain carbohydrates, proteinaceous substances, amino acids, fats and oils, vitamins and minerals. However it must be recognised that it is the CSC's that are the primary regulators of microbial activity. The growth media supplement simply removes the lack of growth limiting factors.

Compositions containing CSC's may also contain chemicals that react with toxic or undesirable by-products of the decomposition processes thereby rendering them non-toxic or more desirable, to supplement or complement the effects of the CSC's. For example, a compound may be added that will mediate the effects of fatty acids or other noxious compounds, or adjust the pH and make the medium more or less suitable for a particular colony or species of bacteria. Alternatively, the CSC may be added to the sewage substrate together with oxygen or an oxidising compound. The CSC stimulates the growth and metabolic rate of aerobic bacteria, while the oxygen supplied removes oxygen deficiency as a growth limiting factor.

At least one CSC or compositions containing at least one CSC may be added to an isolated sewage substrate. Alternatively, they may be added at specific points along a sewerage catchment network, at a sewage treatment plant or may be added to the sewage effluent. The at least one CSC or compositions containing at least one CSC may be added in a bolus or may be added continuously or at intervals by means of a simple drip feed or a pumping system. The at least one CSC or compositions containing at least one CSC may be in a spray or drip form and may be added to the sewage by spraying or dripping on to the surface of the sewage. At the point of adding the at least one CSC or compositions containing at least one CSC, there may be a means of mixing the CSCs with the substrate to assist dispersion of the at least one CSC throughout the sewage substrate. There may also be a means of monitoring the concentration of a CSC that is added to an organic waste substrate to ensure the desired concentration is maintained, additions of further CSC may be made if the concentration drops below a desired level, or addition may be suspended if the concentration rises above a desired level. A person skilled in the art will be able to determine an appropriate means and amounts of adding the CSCs or compositions containing them to a substrate.

The at least one CSC or composition containing at least one CSC may be in the form of liquids, solutions, powders, granules, pellets or a gaseous form. Compositions containing at least one CSC may also contain other suitable carriers or adjuvants. The compositions may also contain components such as dispersing agents, binders, wetting agents and other surfactants, fillers or other components that complement or supplement the activity of the CSC. Advantageously, the CSC's are generally added to sewage back in the network catchment by means of peristaltic pumps, however, the CSC's may also be added in the form of slow-release pellets or granules, allowing the CSC to be released into the substrate over a period of time. Alternatively they may be added to the system in a gaseous form or dissolved into the liquid state.

In a preferred aspect of the invention there is provided a method of treatment of a sewage substrate comprising:
  adding at least one cell signalling chemical (CSC) to a sewage substrate, wherein the at least one CSC enhances the activity of aerobic, anaerobic or facultative anaerobic microbial populations in the sewage substrate.

This aspect of the invention is particularly useful in up regulating the microbial activity and hence increasing the rate of sewage decomposition in sewage treatment plants. It may also be used to promote the resuscitation of dormant, non-growing or slow-growing microbes that aid in the decomposition of sewage. These processes may be further enhanced by adding the cell signalling chemical in a composition containing growth promoting media: wherein the growth promoting media corrects possible nutrient imbalances that would otherwise impact by limiting the effect of the CSC, on a specific microbial population or populations.

In yet another preferred aspect of the invention there is provided a method of reducing microbial activity in the sewerage catchment network comprising:
  adding at least one cell signalling chemical (CSC) to the sewerage catchment network,
  wherein adding the at least one CSC to a sewerage catchment network down regulates aerobic, facultative anaerobic and anaerobic microbial activity in a sewage substrate.

This aspect of the invention is particularly useful in reducing sewage decomposition in the sewerage catchment network and for delivering fresher sewage to the sewage treatment plant. Fresh sewage arriving at the sewage treatment plant, allows for the optimisation of the aerobic decomposition of sewage, in accordance with the engineering design criteria for the sewage treatment plant.

In another preferred aspect of the invention there is provided a method of reducing odour in sewage treatment systems comprising:

adding at least one cell signalling chemical (CSC) to a sewage treatment system, wherein the at least one cell signalling chemical inhibits (down regulates) the activity of the odour producing microbes or enhances (up regulates) the activity of other microbial populations in the sewage treatment system, so that the other microbial populations out compete the odour producing microbes for the same food source.

As used herein the term "sewage treatment system" refers to both sewerage catchment network and sewage treatment plant.

This aspect of the invention is particularly useful in reducing malodorous sulfide gases in decomposing sewage, particularly hydrogen sulfide gas, which is produced by the activity of sulfur or sulfate reducing bacteria. Such gases may be produced in the sewerage catchment network or at the sewage treatment plant. The activity of other microbial populations may be enhanced thereby allowing those microbes to out-compete the sulfur reducing bacteria for the same food source.

The addition of at least one CSC to a sewerage catchment network, may down regulate the behaviour of a sulfur reducing microbial population, causing them to dissociate from a biofilm or alternatively it may cause the dissociation of the biofilm resulting in the bacteria resuming their planktonic state, preventing swarming or quorum sensing, inhibiting their reproduction and/or reducing their metabolic rate. The sulfur or sulfate reducing bacteria in their planktonic form only produce about a $1000^{th}$ of the amount of sulfide that they produce when in a biofilm form. Alternatively, the at least one CSC may up regulate the behaviour of desirable microbes by stimulating swarming, quorum sensing, increasing their reproduction and/or metabolic rate allowing them to out compete the sulfur reducing bacteria for the same food source.

In yet another preferred aspect of the invention there is provided a method of reducing or preventing corrosion in sewerage treatment systems comprising:

adding at least one cell signalling chemical to a sewerage treatment system, wherein the at least one cell signalling chemical inhibits the activity of microbes that convert hydrogen sulfide to hydrogen sulfate (sulfuric acid).

The CSC may suppress the production of dissolved sulfides and hydrogen sulfide gas, thereby removing a food source for the microbes, or alternatively it may disrupt communication signals between sulfate producing bacteria thus down regulating these bacteria and thereby reducing the amount of sulfate produced.

This aspect of the invention is particularly useful in preventing corrosion in both the sewerage catchment network and the sewage treatment plant.

In yet a further preferred aspect of the invention there is provided a method of inhibiting the formation or maintenance of biofilms in sewerage catchment networks comprising:

adding at least one cell signalling chemical to a sewerage catchment network, wherein the at least one cell signalling chemical inhibits swarming and quorum sensing in a population of microbes.

As used herein the term "quorum sensing" refers to the communication level, that is, signal type and signal strength, between bacteria that determines if the bacteria remain in a planktonic state, swarm, colonise or form biofilms. More specifically, on reaching a quorum, the phenotype expression of the bacteria changes as they change from a single cellular state to a colony or multicellular state. Quorum sensing occurs when numerous bacteria communicate intercellularly to regulate the transcription of multiple target genes in concert with cell density. Under natural conditions quorum sensing is mediated through the production of one or more pheromones and signal strength is a critical factor in determining if a quorum exists and changes planktonic bacterial behaviour through mediated gene expression to that of a colony.

As used herein the term "biofilm" refers to the slimes that are formed, generally on the surfaces of objects when colonised by bacteria. Of particular interest are:

the biofilms that cause bulking in sludges the biofilms that form on the walls of sewerage catchment pipes and the biofilms that form on sediment depositions in the sewerage catchment pipes.

The biofilm complex that forms filamentous bulking in sludges, reduces the activated sludge processing ability and settling ability. This aspect of the invention is useful in reducing/preventing filamentous bulking of sludges and improving sewage processing and sludge digestion. The CSC may be used to control the formation and/or maintenance of populations of filimentous bacteria responsible for bulking in sludges.

CSC's may be added to a sewage substrate to prevent biofilm production and/or its adhesion to surfaces as the CSC disrupts the bacteria's ability to form an adhesion layer to the substrate and form biofilms or the CSC prevents the formation of polysaccharides necessary in the formation of biofilms. The use of furanones to block N-acyl homoserine lactones such as 3-oxo-decanoyl homoserine lactone and butyryl homoserine lactone or mixtures thereof is a particularly useful aspect of the invention as it prevents the adhesion and/or polysaccharide production necessary for the formation of biofilms.

Biofilms that form on surfaces may contain sulfur reducing bacteria as part of the biofilm complex structure. The use of CSC's to remove biofilms or the sulfur reducing bacteria from biofilms is an important aspect of the invention, as it prevents the formation of the malodorous gas, hydrogen sulfide, and other malodorous gases in the sewerage catchment network.

When forming biofilms, microbes use a sophisticated system of intracellular communication signals (CSC). Disrupting the intracellular communication signals (CSC) prevents a biofilm forming or alternatively disperses a biofilm as the communication signal or signal strength is not maintained. The prevention or dispersal of specific biofilms containing anaerobic sulfur reducing bacteria in organic waste sewerage catchments, assists in the control of sulfur reducing microbes and therefore controls odour in the sewerage catchment and at the sewage treatment plant. Reduced levels of dissolved sulfides in the influent sewage arriving at the sewage treatment plant, also enhances processing of the sewage at the sewage treatment plant.

In yet another preferred aspect of the invention there is provided a method of enhancing microbial digestion of sewage at a sewage treatment plant comprising:

adding at least one cell signalling chemical (CSC) to a sewage substrate at the sewage treatment plant or in the sewerage catchment network, wherein the at least one cell signalling chemical (CSC) enhances the activity of aerobic and facultative anaerobic bacteria.

This aspect of the invention is particularly useful in treating sewage as it arrives at the sewage treatment plant. Advantageously, an increase in aerobic and facultative anaerobic activity, reproduction and/or metabolic rates aids microbial digestion of the sewage which improves the sewage effluent quality and reduces sludge volumes. Particularly useful in this aspect of the invention are AHL's, pheromone peptides, N-acylated, C-amidated D-amino acid hexapeptides, D-amino acids comprising D-isoleucine and/or D-tyrosine, cyclic dipeptides, hydrophobic tryamines, lipopeptide biosurfactants, fatty acid derivatives, antimicrobial peptides and furanones. Especially preferred CSC's are AHL's.

In yet another preferred aspect of the invention there is provided a method of managing methane gas production at a sewage treatment plant comprising:

adding at least one cell signalling chemical (CSC) to a sewage substrate in the sewerage catchment network or at the sewage treatment plant, wherein the at least one cell signalling chemical (CSC) enhances or inhibits the activity of anaerobic, methane forming bacteria.

This aspect of the invention is particularly useful for managing methane gas production. This is desirable as methane gas is a "greenhouse gas". Better management of methane gas production, may facilitate its collection and its conversion to carbon dioxide and water, through combustion of this gas.

In yet another preferred aspect of the invention there is provided a method of controlling the bacteria responsible for the oxidation or reduction of nitrogenous compounds in a sewage substrate comprising:

adding at least one cell signalling chemical (CSC) to the sewage substrate, wherein the at least one CSC regulates the activity of ammonia producing bacteria, nitrite producing bacteria, nitrate producing bacteria or denitrifying bacteria.

Specific CSC's or combinations of CSC's and/or specific CSC signal strengths can be used to up or down regulate the bacteria responsible for the ammonification, nitrification and denitrification of sewage. This aspect of the invention is particularly useful in controlling a range of environmental pollutants, both airborne and waterborne. N-acyl homoserine lactones such as 3-oxo-decanoyl homoserine lactone and butyryl homoserine lactone or mixtures thereof are particularly useful in up regulation, while halogenated furanones, hydroxylated furanones and alkyl furanones are particularly useful in the down regulation of this aspect of the invention.

In yet another preferred aspect of the invention there is provided a method of enhancing digestion of sewage sludge comprising:

adding at least one cell signalling chemical (CSC) to a sewage substrate, wherein the at least one cell signalling chemical enhances the activity of aerobic or anaerobic bacteria.

This aspect of the invention is particularly useful in increasing the rate of aerobic or anaerobic non-sulfur reducing bacterial digestion of sewage sludge thereby reducing sludge volumes and odour.

In yet another aspect of the invention there is provided a method of resuscitating dormant microbes, or microbes that are in a starvation or stationary phase in a sewage substrate comprising:

adding at least one cell signalling chemical (CSC) to a sewage substrate, wherein the at least one cell signalling chemical (CSC) stimulates activity in the dormant, starved or stationary microbes.

This aspect of the invention allows the resuscitation of desirable microbes that are present in the sewage but are not active. Sewage is often a toxic and hazardous environment for microbes. Numerous toxic household and industrial chemicals are poured down sewers. These toxic chemicals often have adverse impacts on microbes, causing them to spore form, or simply down regulate to a dormant or stationary phases. Being able to up regulate and resuscitate beneficial microbes using CSC's is often important in improving sewage process.

Long transport distances of sewage can cause carbon starvation in the sewage, again causing bacteria to down regulate to a dormant or stationary phase, or spore form. The use of CSC's can be important in mitigating carbon starvation by down regulating the bacteria at one stage and then using CSC's to up regulate and/or resuscitate bacteria at another stage in the sewerage catchment, or at the sewage treatment plant. This aspect of the invention is important in mitigating the effects of carbon starvation stress and poor sewage processing. Especially preferred CSC's useful in this aspect of the invention are furanones.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

EXAMPLES

Example 1

Methodology for testing the effectiveness of various CSC's dose rates.

The methodology is reliant on well defined NATA certified procedures (Australian, British or American Standards) for standard plate (heterotrophic) microbial counts. The plate counts undertaken are:

Aerobic,
Anaerobic including facultative anaerobes and
Sulfur reducing bacteria.

Sampling procedures are reliant on taking predefined sewage sample. The sewage sample is then broken down into sub-samples of 800 ml. One of these sub-samples remains as the control, while the CSC's being tested, are added in specific amounts (generally nanograms to milligrams/liter) to other identical sub-samples.

Each of the 800 ml sub-sample of sewage, is then shaken to thoroughly to ensure that the sewage is mixed with the added CSC's. The control sub-sample is also shaken for an identical time and in an identical manner, to ensure consistency between the sub-samples.

Each sub-sampled is then decanted into 4 identical 200 ml samples called A, B, C & D.

The A samples from each replication is then subjected to the NATA certified procedures for standard plate counts.

If testing for aerobic microbial response, the B, C and D samples are aerated by means of an air pump injecting a small but steady stream of air into the base of the sample and allowing the air to bubble up through the sewage mix for two minutes every four hours.

If testing for an anaerobic response, each 200 ml B, C & D sample is tightly capped with an airtight cap to prevent further air entering the sample.

After 24 hours the B samples from each replication are then subjected to the NATA certified procedures for standard plate counts in an identical manner to the A samples.

After 48 hours the C samples from each replication are then subjected to the NATA certified procedures for standard plate counts in an identical manner to the A samples.

After 72 hours the D samples from each replication are then subjected to the NATA certified procedures for standard plate counts in an identical manner to the A samples.

Example 2

Figure 1:
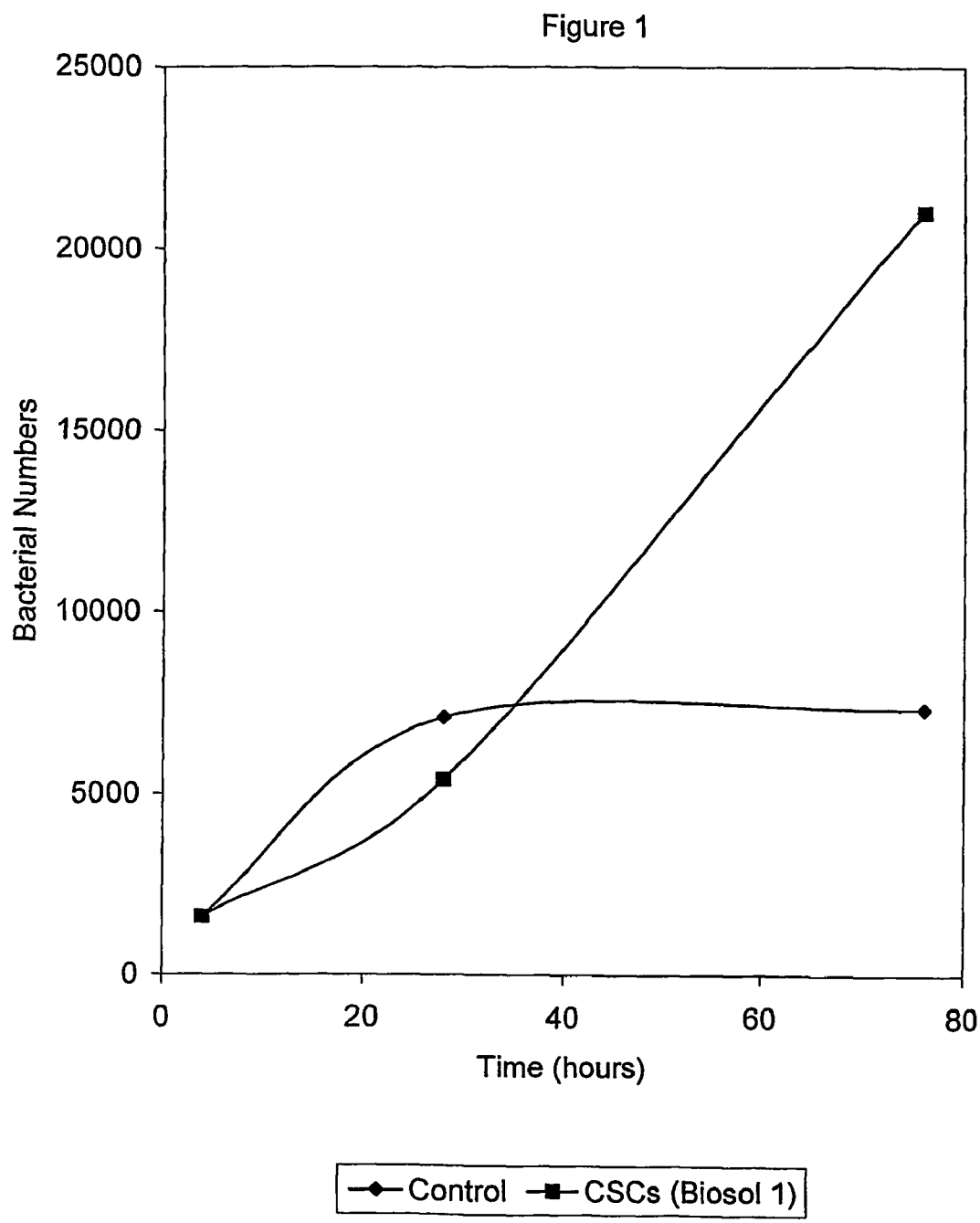
FIG. 1 graphically represents the response of aerobic microbes in a sewage sample to a biosol 1 mix of CSC's, where bacterial numbers are measured by standard plate counts.
Figure 2:
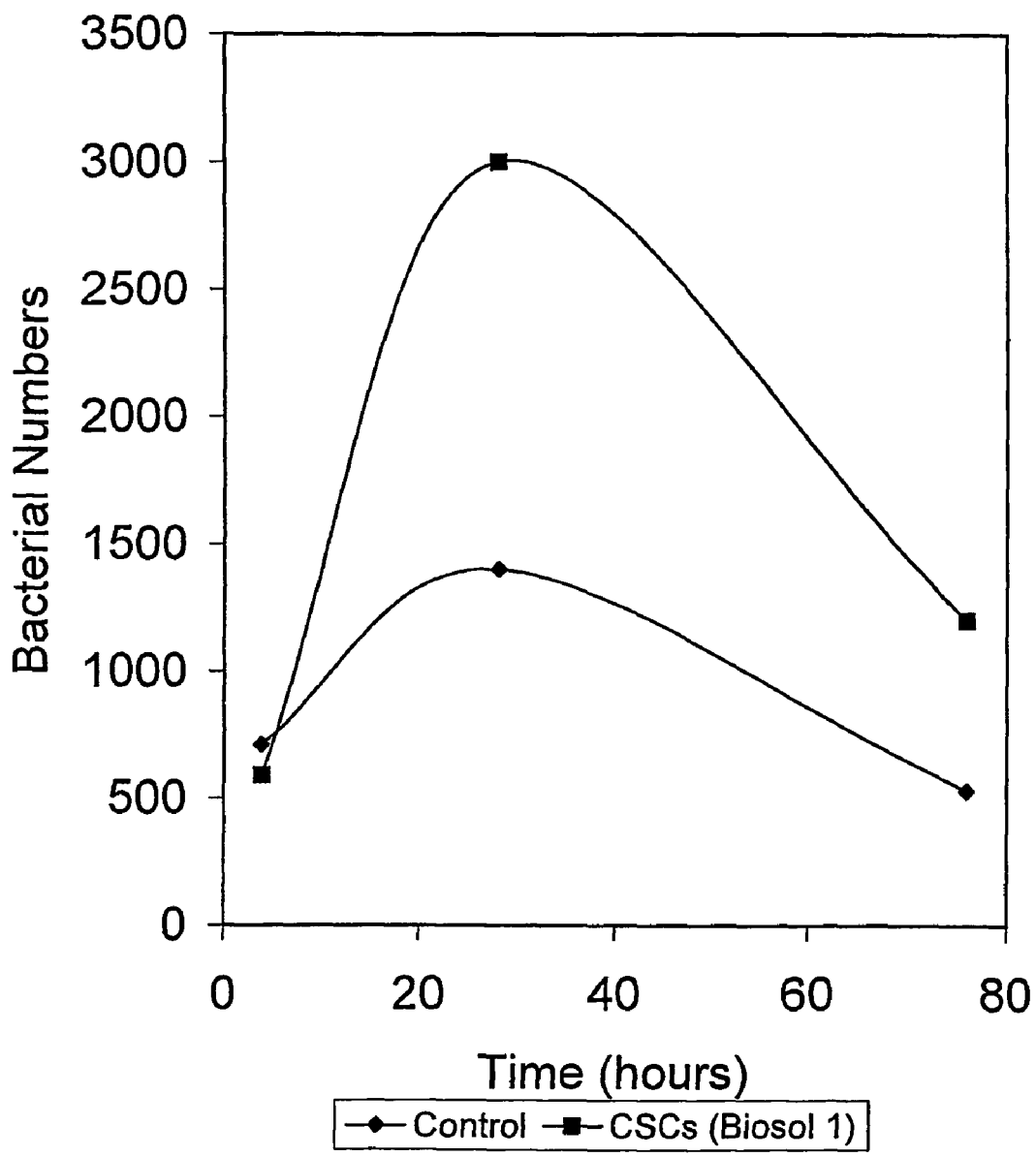
FIG. 2 graphically represents the response of anaerobic microbes in a sewage sample to a biosol 1 mix of CSC's, where bacterial numbers are measured by standard plate counts.
Figure 3:
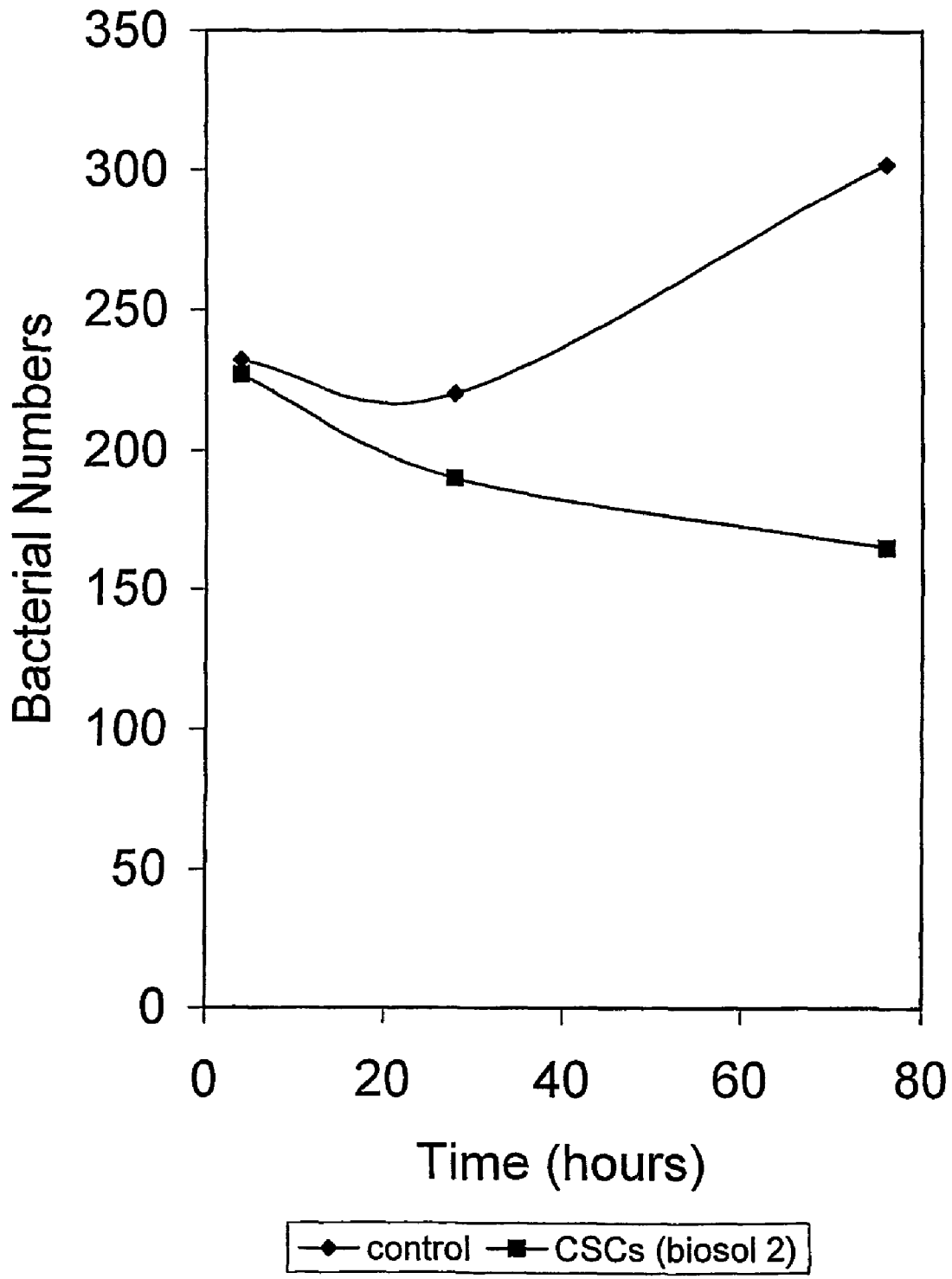
FIG. 3 graphically represents the response of sulfur reducing microbes in a sewage sample to a biosol 2 mix of CSC's, where bacterial numbers are measured by standard plate counts.

Using the procedure outlined in Example 1, a mix of CSCs (Biosol 1 or 2) was added to a sewage sample. The compositions termed Biosol 1 and Biosol 2 give an indication of what can be achieved with a relatively fresh sewage sample taken from the head of works at a small sewage treatment plant. The results are shown in FIGS. 1 to 3.

The composition of Biosol 1 is:
0.05 mg/L N-(3-oxohexanoyl)-L-homoserine lactone
0.05 mg/L 3-oxydodecanoyl homoserine lactone
0.005 mg/L N-butanoyl-L-homoserine lactone
0.01 mg/L Zeatin
0.08 mg/L 6($\gamma\gamma$-dimethyallylamino) purine
0.08 mg/L 6-benzylamino-purine
0.1 mg/L 3-hydroxypalmitic acid methyl ester
0.1 g/L extract from *Delisea pulchra* (a known source of furanones) the contents of half of one 1000 mg multivitamin capsule
1 g of yeast extract
0.1 g seaweed powder (for minerals) (*Durvillea potatorun*)

The mixture was made up to one liter using deionised water. This mix was added at a rate of 4 mg/L sewage.

The composition of Biosol 2 is:
0.005 mg Rhodomine
2 g/L extract from *Delisea pulchra* (a known source of furanones)
0.005 mg/L N-butanoyl-L-homoserine lactone the contents of half of one 1000 mg multivitamin capsule
1 g yeast extract
0.1 g seaweed powder (for minerals) (*Durvillea potatorun*).

The mixture was made up to one liter using deionised water. This mix was added at a rate of 4 mg/L sewage.

FIG. 1 shows that the mix of CSCs (Biosol 1) initially suppressed aerobic microbial activity, prior to a substantial increase in microbial numbers, as indicated by the number of colony forming units. The control showed an initial rapid response in microbial activity, but then failed to respond to the available food source.

FIG. 2 shows that the mix of CSCs (Biosol 1) resulted in a rapid increase in anaerobic microbial populations in raw sewage.

FIG. 3 shows that the mix of CSC's in Biosol 2 causes the reduction in sulfur reducing bacteria colony forming units. Although the control initially showed a reduction in sulfur reducing bacteria, the sulfur reducing bacteria increased in numbers after 28 hours of incubation.

Example 3

Using the procedure outlined in Example 1, specific CSC's were added to sewage samples in vitro at specific dose rates. Each sample containing a different CSC as outlined in Table I below and each sample was divided into three sub-samples. The first sub-samples were plated within 4 hours for analysis by standard plate counts for aerobic, anaerobic and sulfur reducing bacteria The second and third sub-samples were aerated every 4 hours and analysed as for sub-sample 1 at 24 hours and 76 hours respectively. The population density of aerobic, anaerobic and sulfur reducing bacteria were determined by the number of colony forming units, counted from each sewage sample analysed.

Figure 4:
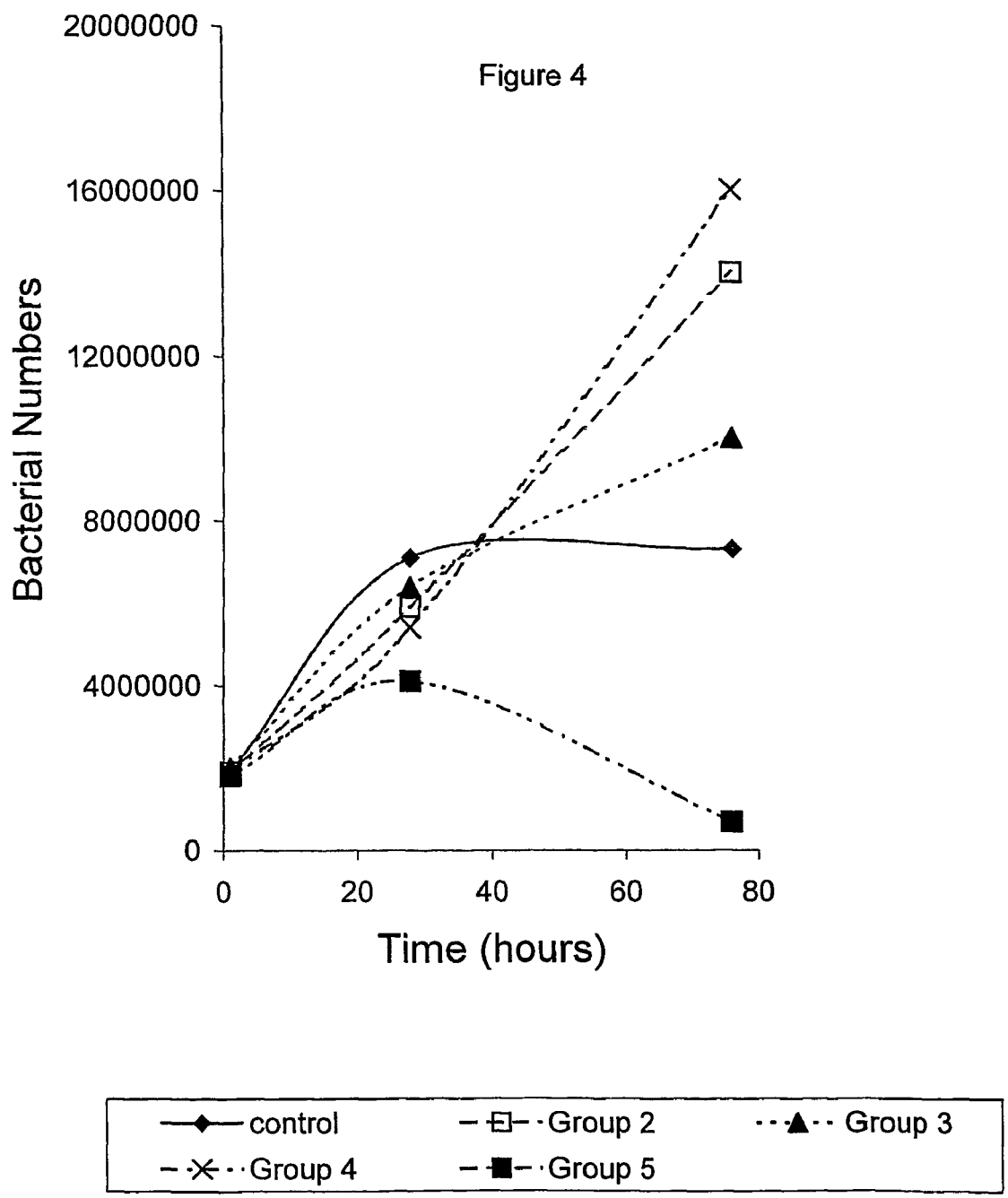
FIG. 4 graphically represents the response of aerobic microbes in a sewage sample to different CSC's set out in Table 1, where samples have been aerated.
Figure 5:
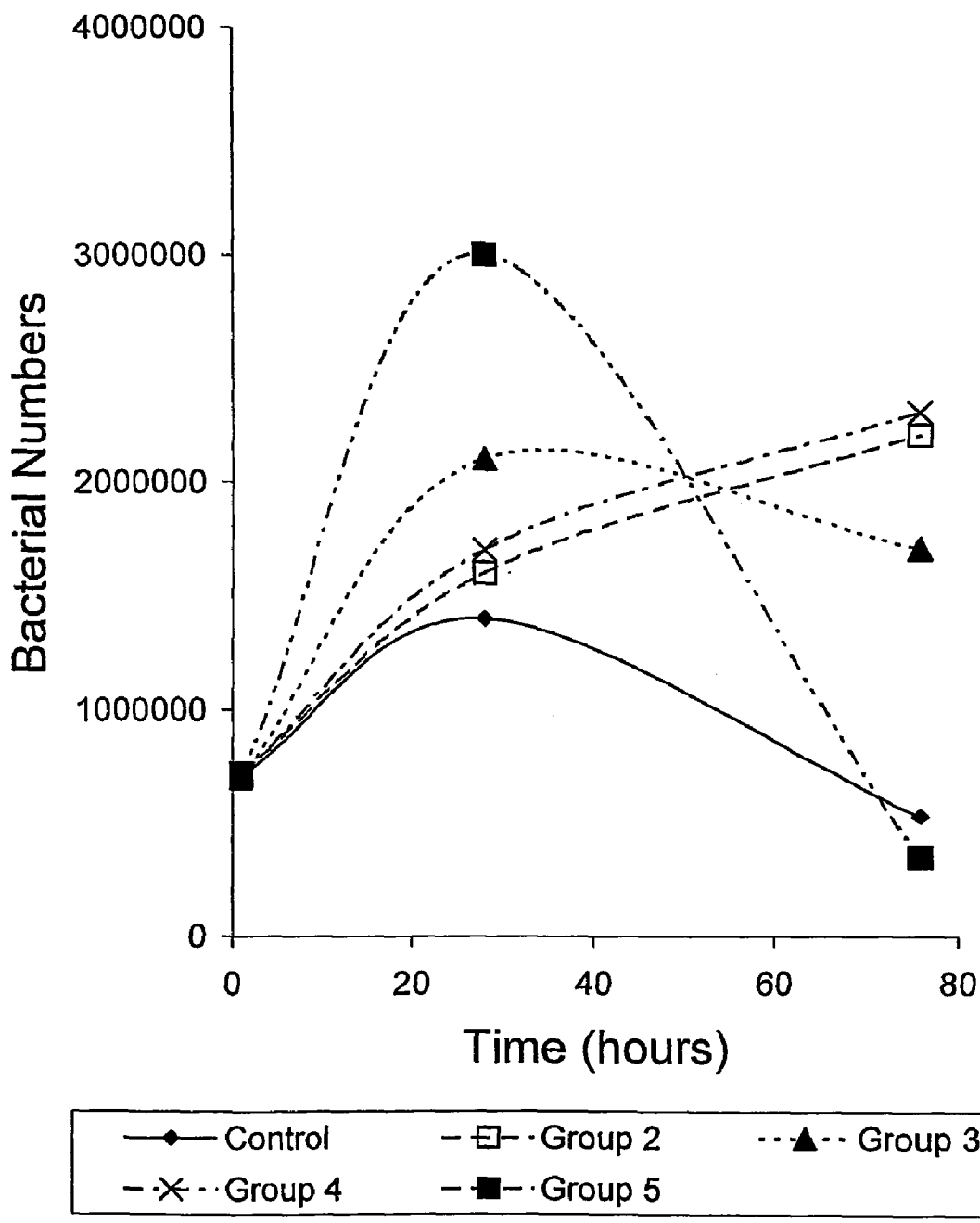
FIG. 5 graphically represents the response of anaerobic microbes in a sewage sample to different CSC's set out in Table 1, where samples have been aerated.
Figure 6:
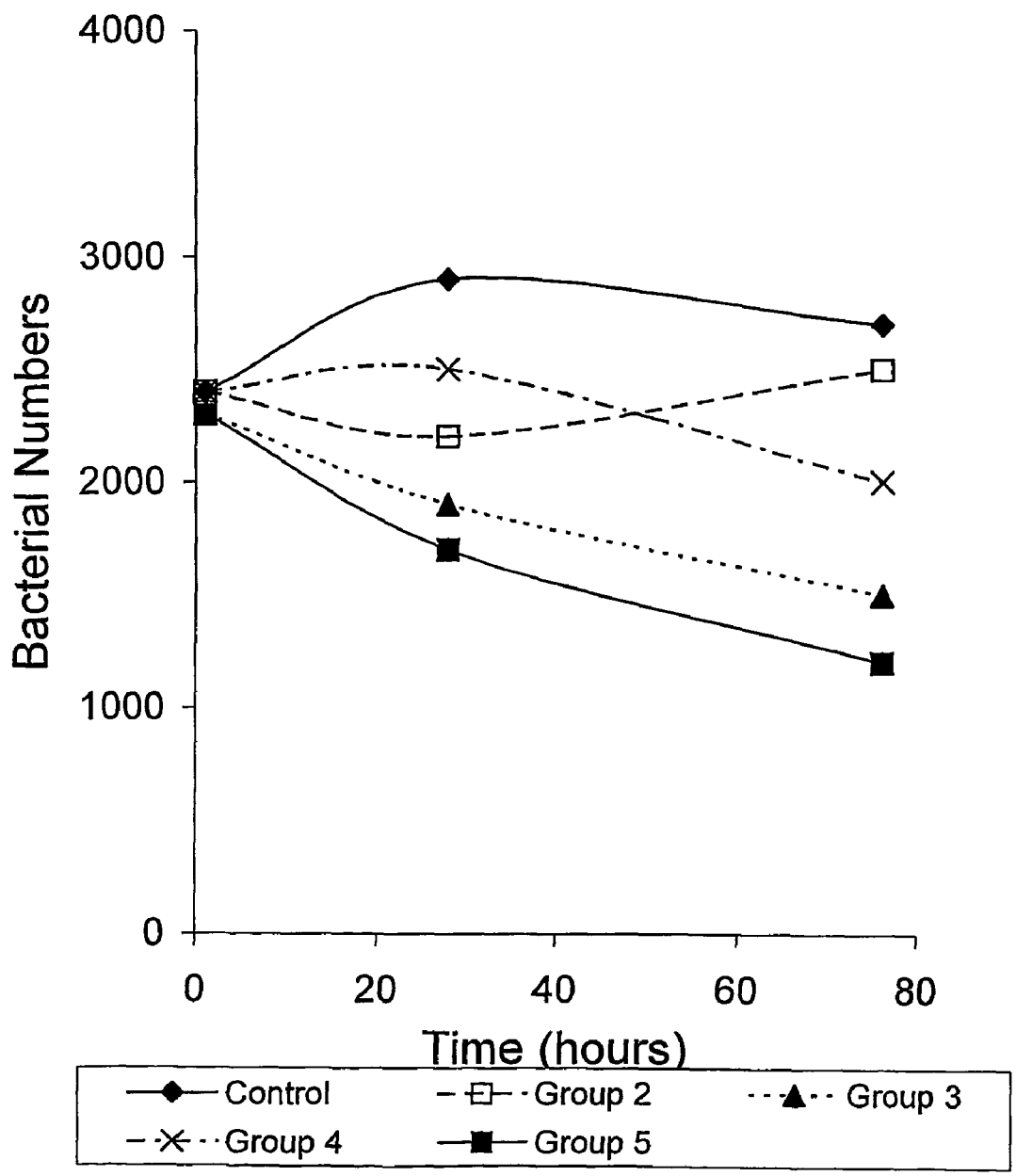
FIG. 6 graphically represents the response of sulfur reducing microbes in a sewage sample to different CSC's set out in Table 1, where samples have been aerated.

The results are shown in FIGS. 4-6. The results show that different CSC's applied to sewage samples at different dose rates could markedly change the microbial population growth rates when compared with the control.

TABLE I

| Group | CSC added | Amount added |
|---|---|---|
| 1 | no CSC-Control | — |
| 2 | Acyl homoserine lactone | 0.5 mg/L |
| 3 | Zeatin | 0.1 mg/L |
|   | 6-($\gamma\gamma$-dimethylallylamino) purine | 0.1 mg/L |
|   | 6-benzylamino-purine | 0.1 mg/L |
|   | Indole-3-Acetic Acid made up to 1 L | 0.1 mg/L |
| 4 | kinetin | 1 mg/L |
| 5 | Rhodamine 123 | 50 ng/L |

Example 4

Figure 7:
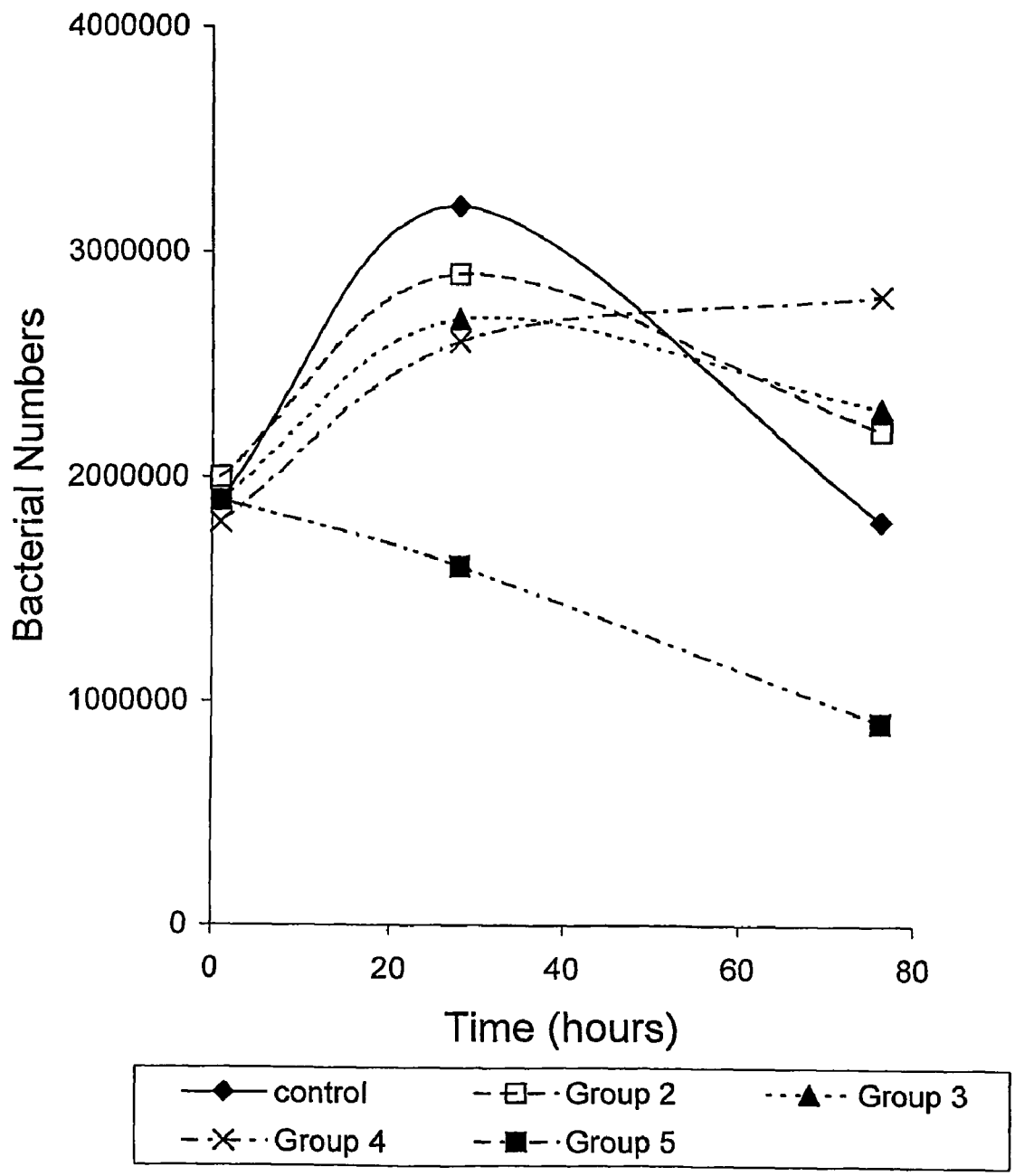
FIG. 7 graphically represents the response of aerobic microbes in a sewage sample to different CSC's set out in Table 1, where samples have not been aerated.
Figure 8:
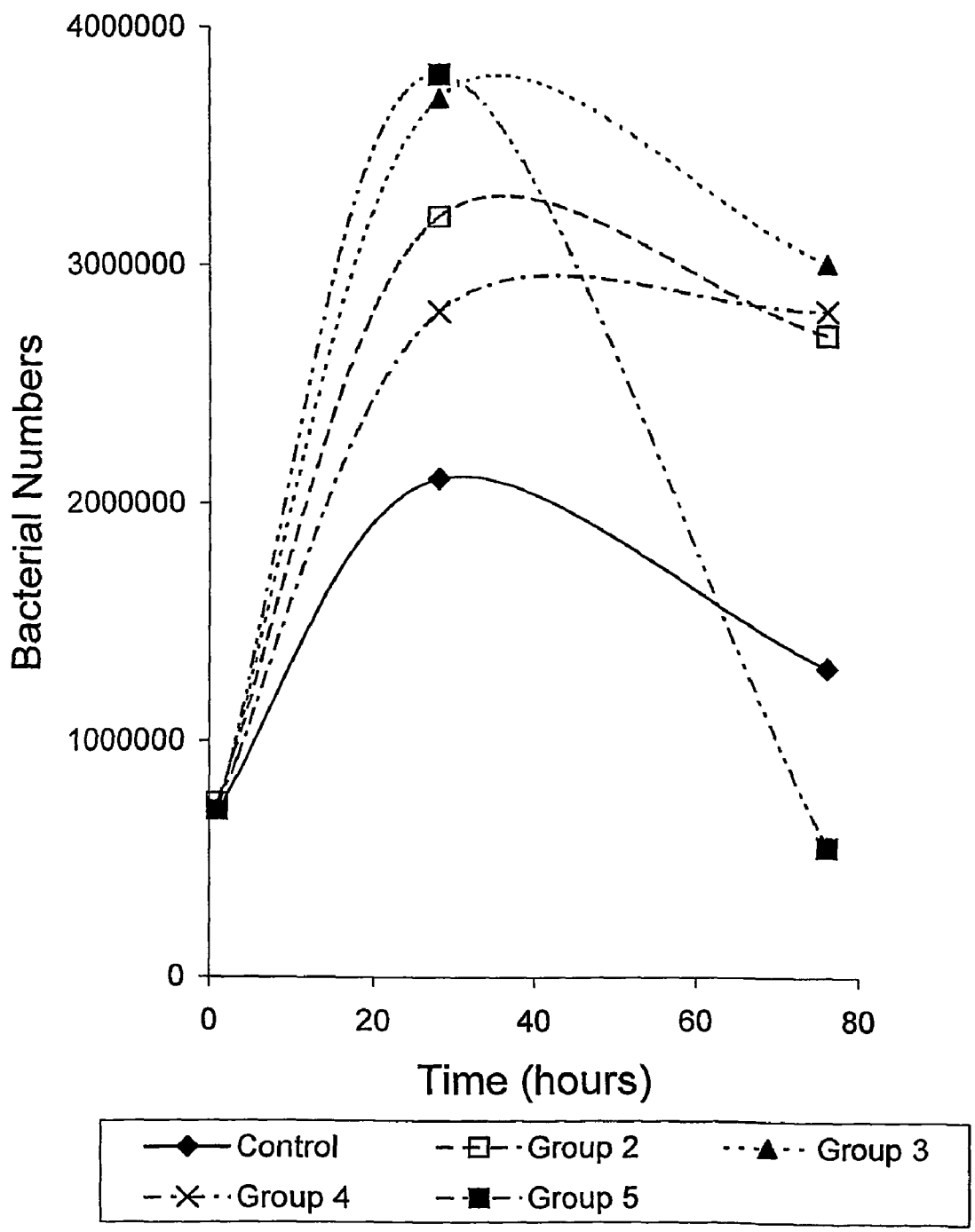
FIG. 8 graphically represents the response of anaerobic microbes in a sewage sample to different CSC's set out in Table 1, where samples have not been aerated.
Figure 9:
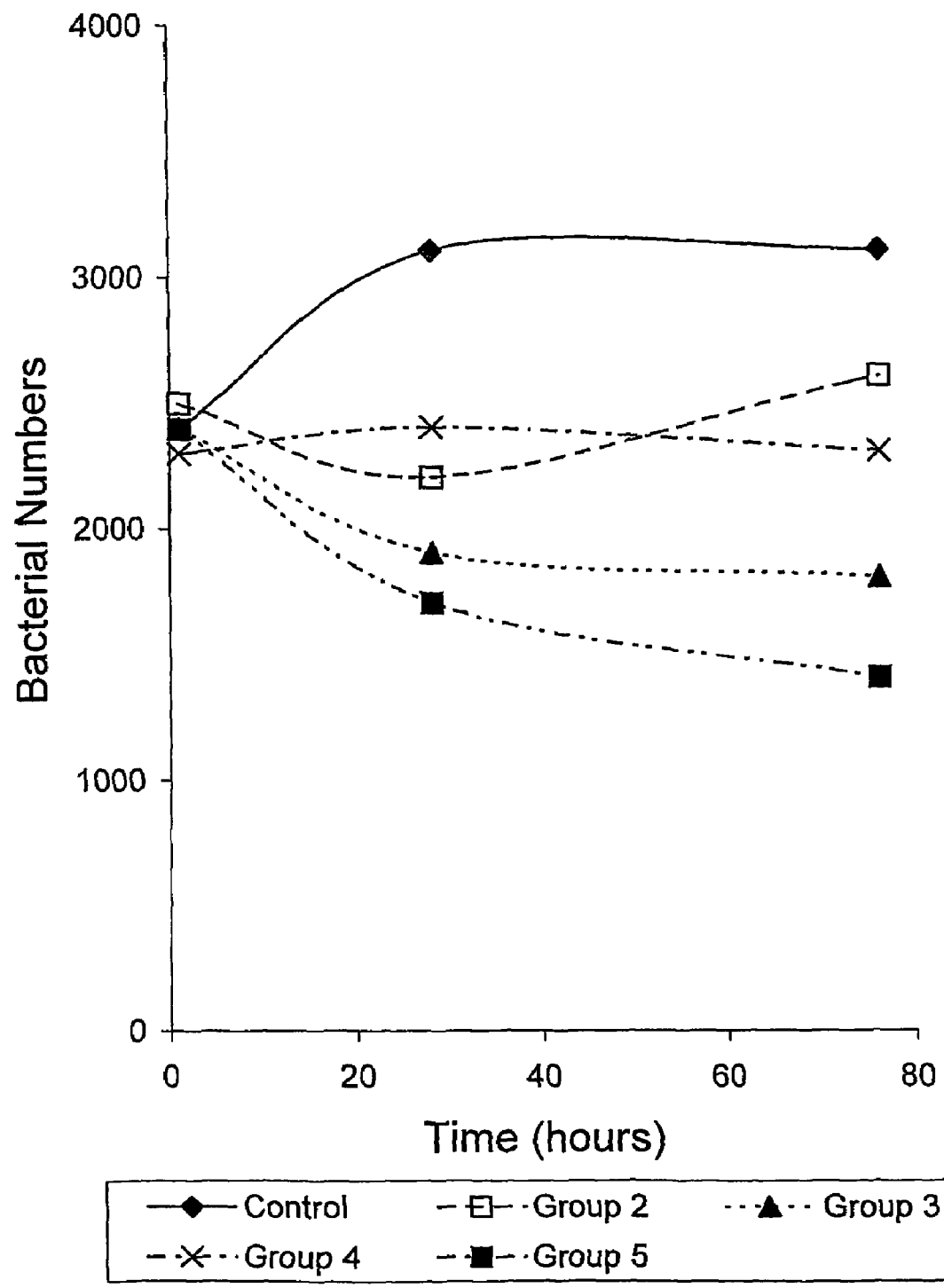
FIG. 9 graphically represents the response of sulfur reducing microbes in a sewage sample to different CSC's set out in Table 1, where samples have not been aerated.

The experiment of Example 3 was repeated but the samples were not aerated. The results are shown in FIGS. 7 to 9.

Example 5

CSC's in the form of Biosol 2 was added at a rate of 4 ppm to a component of a sewage catchment. Hydrogen sulfide gas readings were halved within 24 hours and the level of dissolved sulfides in the sewage decreased by 48% during the same time.

Example 6

Biosol 1 was added at a rate of 4 ppm to the catchment of a small sewage treatment plant handling a septic high organic load. It allowed the dissolved oxygen levels in the aerobic chamber to increase from less than 1 ppm to around 7 ppm. It reduced sludge volumes by 52% and suspended solids in the effluent by 80%.

The results of Examples 5 and 6 are in line with the expectations from the in vitro experiments.

Example 7

A mix of halogenated furanones (1 g/L) in distilled water were added using a peristaltic pump at a rate of approximately 0.5 mg/liter to sewage flowing in a small gravity sewage pipe containing an established biofilm matrix. After one month a noticeable reduction in the biofilm on the pipe walls and bare patches of pipes were evident. The mix of halogenated furanones appeared to cause the sloughing off of biofilms from the sewage pipe walls and affected the formation of biofilms.

Example 0.8

An equal mix of halogenated furanones, hydroxylated furanones and alkyl furanones (1 g/L) and AHL's (1 g/L) were mixed in distilled water and were added using a peristaltic pump at a rate of approximately 4 ml of mixture per liter of sewage flowing in a small gravity sewage pipe containing an established biofilm matrix. After one month their was a noticeable reduction in the biofilm on the pipe walls and bare patches of pipes were also evident. The furanone mix appeared to disrupt the AHL signals and cause the sloughing off of biofilms from the sewage pipe walls and affect the formation of biofilms.

Example 9

An extract from *Delisea pulchra* (collected from Cape Banks NSW chilled and freeze dried within 24 hrs) was prepared by vitamising and using dichloromethane to extract the CSC's from the *Delisea pulchra*. The extract and crude fibre were reduced in vacuo prior. 10 g of fibre and extract per liter of water were then vitamised for 20 minutes with sufficient ascorbic acid to lower the mix to pH 3.5. The liquid was allowed to settle for 2 hrs and the supernatant collected for use. This extract which is a known source of furanones was added to a sewage pipeline at an approximate rate of 4 ml/l of sewage flowing in the pipe over 4 weeks. After 4 weeks the extract appeared to cause the sloughing off of biofilms from the sewage pipes and affect biofilm formation.

Figure 10:
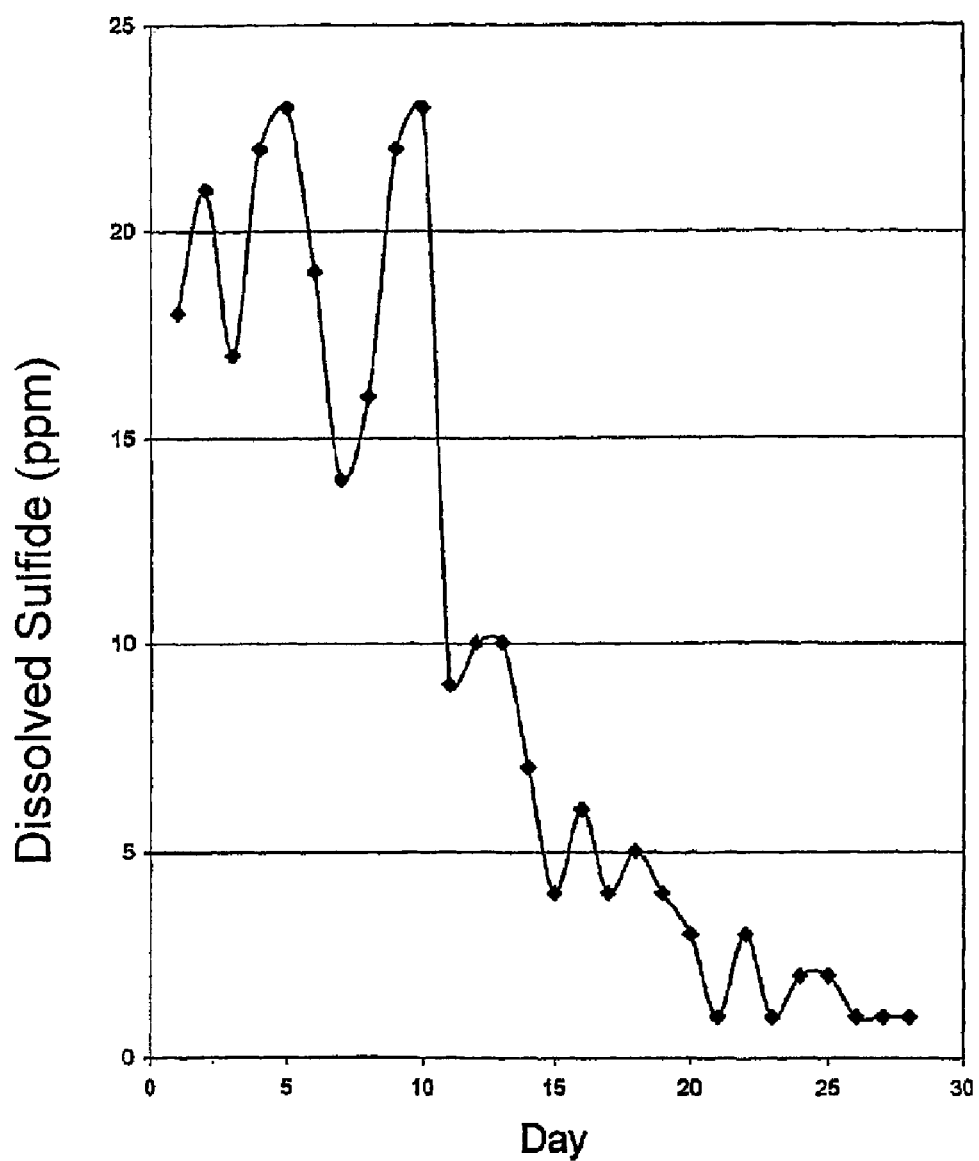
FIG. 10 graphically represents the average amount of dissolved sulfides in a sewage sample over a period of time during which sloughing and reduction of a biofilm is observed.

Examples 7, 8 & 9 were also used to measure the impact on dissolved sulfide production. Initially there was a rise in dissolved sulfides followed by a fall in the levels of dissolved sulfides in the sewage. The initial rise in dissolved sulfides was attributed to high levels of dissolved sulfides in the sloughing biofilm. The decrease in the rate of dissolved sulfide production was attributed to a reduction in the biofilm and a change in the microbial matrix of the biofilm. See Table 2 and FIG. 10.

TABLE 2

| Day | Average results Expt 7, 8 & 9 ppm |
|---|---|
| 1 | 18 |
| 2 | 21 |
| 3 | 17 |
| 4 | 22 |
| 5 | 23 |

TABLE 2-continued

| Day | Average results Expt 7, 8 & 9 ppm |
|---|---|
| 6 | 19 |
| 7 | 14 |
| 8 | 16 |
| 9 | 11 |
| 10 | 13 |

Example 10

A mix of halogenated furanones (1 g/L) was added to each liter of the *Delicia pulchra* extract. This mix was added at a rate of approximately 4 mg/liter by a pump station, to the pumped sewage flowing in a small pressure sewerage main. This pressure main contained an established biofilm matrix. The sewage as it exited the pressure main was anaerobic and became highly odorous as it moved into the gravity main. The gases were believed to be mainly composed of hydrogen sulfide but other malodorous gases such as mercaptans, indoles and skatoles were present. Prior to adding the mix above, hydrogen sulfide gas levels averaged around 180 ppm at the end of the pressure main. One week after adding the above mix, the hydrogen sulfide gas levels had decreased to an average of 47 ppm. One month after adding the mix the hydrogen sulfide levels had reduced to average 4 ppm. Although not specifically tested, there was a noticeable absence of mercaptan, indole and skatole type odours.

An "OdaLog" (0-1000 ppm $H_2S$) gas loggers, was suspended in a manhole at the end of the pressure main, over 24 hours to measure $H_2S$ gas levels. The average reduction in the $H_2S$ gas level was calculated from these readings.

Example 11

A mix of halogenated furanones (1 g/L) was added to each liter of the *Delicia pulchra* extract. This mix was added at a rate of approximately 4 mg/liter, to sewage flowing in a sewerage pipe containing an established biofilm matrix. The pipe contained sewage that was septic, but this was aerated as the sewage tumbled into a wet pump well. The nitrous oxide released into the pump well chamber at the end of the pipe was measured with a $NO_2$ gas data logger from 5.40 am to 9.00 am for 4 days. While the level of $NO_2$ gas varied as expected, the average reduction was about 70% with the addition of the above mix to the sewage sampled.

TABLE 3

| Time AM | No added Mixture $NO_2$ ppm(control) | Added Mixture $NO_2$ ppm | % Change in $NO_2$ produced |
|---|---|---|---|
| 5.40 | 19.69 | 7.50 | 38% |
| 6.00 | 11.79 | 3.75 | 32% |
| 6.20 | 17.50 | 10.63 | 61% |
| 6.40 | 32.77 | 16.88 | 51% |
| 7.00 | 30.89 | 17.77 | 58% |
| 7.20 | 14.29 | 9.82 | 69% |
| 7.40 | 11.96 | 0.00 | 100% |
| 8.00 | 16.96 | 0.89 | 95% |
| 8.20 | 20.45 | 1.79 | 91% |
| 8.40 | 25.89 | 0.00 | 100% |
| 9.00 | 17.41 | 0.00 | 100% |

Example 12

The same mix as used in Example 11 above was sprayed on and around an odorous men urinal. The odour was eliminated within an hour. This indicated that urea was not being converted to ammonia, the major odour source around stale urinals.

The invention claimed is:

1. A method of treatment of sewage comprising:
   assessing at least one of volume, flow rate, Biochemical Oxygen Demand/Chemical Oxygen Demand loading, and bacterial composition of said sewage to determine a dosage of at least one cell signaling chemical (CSC); and
   adding the dosage of the at least one cell signalling chemical to said sewage, wherein the at least one CSC regulates activity in at least one microbial population in said sewage by modulating gene expression within a microbial cell or modulating communication signals between microbial cells or populations of microbial cells, wherein the microbial population includes aerobic bacteria, facultative anaerobic bacteria, anaerobic bacteria, or combinations thereof, and wherein the at least one CSC does not kill the bacteria in the microbial population.

2. The method according to claim 1 wherein the at least one CSC is a bacterial pheromone, a eukaryotic hormone or a diffusible communication molecule.

3. The method according to claim 2 wherein the bacterial pheromones are selected from the group consisting of N-acyl homoserine lactones (AHLs), pheromone peptides, N-acetylated, C-amidated D-amino acid hexapeptides, D-amino acid peptides comprising D-isoleucine and/or D-tyrosine, cyclic dipeptides, hydrophobic tryamines, lipopeptide biosurfactants, fatty acid derivatives, antimicrobial peptides and furanones.

4. The method according to claim 1 wherein the eukaryotic hormones are selected from the group consisting of auxins, cytokinins, cytokines, ethylene gas, gibberellins and abscisic acid.

5. The method according to claim 1 wherein the at least one CSC is Rhodomine 123 and/or 3-hydroxypalmitic acid methyl ester.

6. The method according to claim 1 wherein the sewage is in a sewerage catchment network or a sewage treatment plant.

7. The method according to claim 1 wherein the activity that is regulated is selected from the group consisting of cell to cell communication, quorum sensing, swarming, bacterial motility, symbiotic associations with multicellular organisms, cell metabolic rates, production of metabolic products, cell division and conjunction, cell resuscitation, formation of biofilm communities, entry into a stationary or dormant phase, discrete and diverse metabolic processes in concert with cell density, antibiotic production and bioluminescence.

8. The method according to claim 1 wherein the microbial population is selected from the group consisting of Gram positive bacteria, Gram negative bacteria, cyanobacteria, autotrophic bacteria, heterotrophic bacteria and nitrogen-fixing bacteria.

9. The method according to claim 1 wherein the microbial population is selected from the group consisting of sulfur reducing bacteria, sulfate reducing bacteria, bacteria that convert sulfide to sulfate, ammonia producing bacteria, nitrite producing bacteria, nitrate producing bacteria and methane producing bacteria.

10. The method according to claim 1 wherein the activity of a microbial population is up regulated, initiated or sustained by the addition of the at least one CSC.

11. The method according to claim 10 wherein the at least one CSC is selected from the group selected from N-acyl homoserine lactones, histidine protein kinase pheromones, N-acetylated, C-amidated D-amino acid hexapeptides, D-amino acid peptides comprising D-isoleucine and/or D-tyrosine, cyclic dipeptides, hydrophobic tryamines, lipopeptide biosurfactants, fatty acid derivatives, antimicrobial peptides furanones, Rhodomine 123 and 3-hydroxypalmitic acid methyl ester.

12. The method according to claim 11 wherein the CSC is an N-acyl homoserine lactone.

13. The method according to claim 1, wherein the activity of a microbial population is down regulated by the addition or reduction in signal strength of the at least one CSC.

14. The method according to claim 13 wherein the at least one CSC is selected from the group selected from N-acyl homoserine lactones, histidine protein kinase pheromones, N-acetylated, C-amidated D-amino acid hexapeptides, D-amino acid peptides comprising D-isoleucine and/or D-tyrosine, cyclic dipeptides, hydrophobic tryamines, lipopeptide biosurfactants, fatty acid derivatives, antimicrobial peptides, halogenated, hydroxylated or alkyl furanones, furanones, Rhodomine 123 and 3-hydroxypalmitic acid methyl ester.

15. The method according to claim 14 wherein the CSC is a halogenated, hydroxylated or alkyl furanone.

16. The method according to claim 1 wherein the at least one CSC is added to regulate microbial gene expression.

17. The method according to claim 16 wherein the microbial gene expression is for control of luminescence or the production of toxins, antibiotics, enzymes, polysaccharides and surfactants.

18. The method according to claim 1 wherein the activity of at least one of anaerobes, facultative anaerobes, and aerobic microbial populations are up or down regulated and the at least one CSC is selected from the group consisting of N-(3-oxohexanoyl)-L-homoserine lactone, 3-oxydodecanoyl homoserine lactone, N-butanoyl-L-homoserine lactone, Zeatin, 6-(-(γγ-dimethylallylamino)purine, 6-benzylamino-purine, 3-hydroxypalmitic acid methyl ester, extracts of *Delisea pulchra*, kinetin, indole-3-acetic acid, Rhodomine 123 and mixtures thereof.

19. The method according to claim 1 wherein the activity of sulfur reducing bacteria is down regulated and the at least one CSC is selected from the group consisting of N-(3-oxohexanoyl)-L-homoserine lactone, 3-oxydodecanoyl homoserine lactone, N-butanoyl-L-homoserine lactone, Zeatin, 6-(-(γγ-dimethylallylamino)purine, 6-benzylamino-purine, 3-hydroxypalmitic acid methyl ester, extracts of *Delisea pulchra*, kinetin, indole-3-acetic acid, Rhodomine 123, 3-oxo-decanoyl homoserine lactone, butyryl homoserine lactone, halogenated furanones, hydroxylated furanones, alkyl furanones, and mixtures thereof.

20. The method according to claim 1 wherein the at least one CSC is added at intervals as a bolus or is added continuously.

21. The method according to claim 1 wherein the at least one CSC is added to the sewage in a sewerage catchment network.

22. The method according to claim 1 wherein the at least one CSC is added to the sewage in a sewage treatment plant.

23. A method of reducing odour in a sewage treatment system which includes a sewerage catchment network and a sewage treatment plant comprising:
   assessing at least one of volume, flow rate, Biochemical Oxygen Demand/Chemical Oxygen Demand loading, and bacterial composition of sewage in said sewage treatment system to determine a dosage of at least one cell signaling chemical (CSC); and adding the dosage of the at least one cell signalling chemical to said sewage, wherein the at least one CSC inhibits the activity of odour producing microbes or enhances the activity of other microbial populations in the sewage treatment system by modulating gene expression within a microbial cell or modulating communication signals between microbial cells or populations of microbial cells so that the other microbial populations out compete the odour forming microbes for the same food source, and wherein the at least one CSC does not kill said odour forming microbes or said other microbial populations.

24. The method according to claim 23 wherein the odour producing microbes are sulfur or sulfate reducing bacteria or ammonia producing bacteria.

25. The method according to claim 23 wherein the at least one CSC is selected from the group consisting of bacterial pheromones, eukaryotic hormones and diffusible communication molecules.

26. The method according to claim 23, wherein the at least one CSC is selected from the group consisting of N-(3-oxo-hexanoyl)-L-homoserine lactone, 3-oxydodecanoyl homoserine lactone, N-butanoyl-L-homoserine lactone, Zeatin, 6-(-(γγ-dimethylallylamino)purine, 6-benzylaminopurine, 3-hydroxypalmitic acid methyl ester, extracts of *Delisea pulchra*, kinetin, indole-3-acetic acid, Rhodomine 123, 3-oxo-decanoyl homoserine lactone, butyryl homoserine lactone, halogenated furanones, hydroxylated furanones, alkyl furanones, and mixtures thereof.

27. A method of reducing or preventing corrosion in a sewage treatment system which includes a sewerage catchment network and a sewage treatment plant comprising:

assessing at least one of volume, flow rate, Biochemical Oxygen Demand/Chemical Oxygen Demand loading, and bacterial composition of sewage in said sewage treatment system to determine a dosage of at least one cell signaling chemical (CSC); and adding the dosage of the at least one cell signalling chemical to said sewage, wherein the at least one CSC inhibits the activity of microbes that convert sulfide to sulfate by modulating gene expression within a microbial cell or modulating communication signals between microbial cells or populations of microbial cells, and wherein the at least one CSC does not kill said microbes.

28. A method of inhibiting the formation or maintenance of biofilms in sewerage catchment networks or sewage treatment plants comprising:

assessing at least one of volume, flow rate, Biochemical Oxygen Demand/Chemical Oxygen Demand loading, and bacterial composition of sewage in said sewerage catchment network or said sewage treatment plant to determine a dosage of at least one cell signaling chemical (CSC); and adding the dosage of the at least one cell signalling chemical to said sewage, wherein the at least one CSC inhibits swarming, quorum sensing or biofilm attachment in a population of microbes by modulating gene expression within a microbial cell or modulating communication signals between microbial cells or populations of microbial cells, and wherein the at least one CSC does not kill said microbes.

29. The method according to claim 28 wherein the at least one CSC is selected from the group consisting of bacterial pheromones, eukaryotic hormones and diffusible communication molecules.

30. The method according to claim 28 wherein the at least one CSC is selected from the group consisting of N-acyl homoserine lactones (AHLs), pheromone peptides, N-acetylated, C-amidated D-amino acid hexapeptides, D-amino acid peptides comprising D-isoleucine and/or D-tyrosine, cyclic dipeptides, hydrophobic tryamines, lipopeptide biosurfactants, fatty acid derivatives, antimicrobial peptides and furanones.

31. The method according to claim 28 wherein the at least one CSC is selected from halogenated, hydroxylated or alkyl furanones.

32. The method according to claim 28 wherein the at least one CSC is selected from 3-oxo-decanoyl homoserine lactone, butyryl homoserine lactone, extracts of *Delisea pulchra* and mixtures thereof.

33. The method according to claim 28 wherein the CSC down regulates production of lipoprotein biosurfactant in a microbial community.

34. The method according to claim 28 wherein the CSC down regulates production of polysaccharides in a microbial community.

35. A method of enhancing microbial digestion of sewage at a sewage treatment plant comprising:

assessing at least one of volume, flow rate, Biochemical Oxygen Demand/Chemical Oxygen Demand loading, and bacterial composition of said sewage to determine a dosage of at least one cell signaling chemical (CSC); and adding the dosage of the at least one cell signalling chemical to said sewage at the sewage treatment plant or as said sewage arrives at the sewage treatment plant, wherein the at least one CSC enhances the activity of at least one of aerobic, facultative anaerobic and anaerobic bacteria by modulating gene expression within a microbial cell or modulating communication signals between microbial cells or populations of microbial cells, and wherein the at least one CSC does not kill said bacteria.

36. The method according to claim 35 wherein the at least one CSC is selected from the group consisting of N-acyl homoserine lactones (AHLs), pheromone peptides, N-acetylated, C-amidated D-amino acid hexapeptides, D-amino acid peptides comprising D-isoleucine and/or D-tyrosine, cyclic dipeptides, hydrophobic tryamines, lipopeptide biosurfactants, fatty acid derivatives, antimicrobial peptides and furanones.

37. The method according to claim 35 wherein the CSC is an N-acyl homoserine lactone, an N-acetylated, C-amidated D-amino acid hexapeptide or a mixture thereof.

38. A method of managing methane gas production at a sewage treatment plant comprising:

assessing at least one of volume, flow rate, Biochemical Oxygen Demand/Chemical Oxygen Demand loading, and bacterial composition of sewage in a sewage treatment system to determine a dosage of at least one cell signaling chemical (CSC); and adding the dosage of the at least one cell signalling chemical to said sewage in the sewage treatment system, wherein the at least one CSC enhances or inhibits the activity of anaerobic, methane forming bacteria by modulating gene expression within a microbial cell or modulating communication signals between microbial cells or populations of microbial cells, and wherein the at least one CSC does not kill said bacteria.

39. A method of enhancing digestion of sewage sludge comprising:
- assessing at least one of volume, flow rate, Biochemical Oxygen Demand/Chemical Oxygen Demand loading, and bacterial composition of sewage containing said sewage sludge to determine a dosage of at least one cell signaling chemical (CSC); and
- adding the dosage of the at least one cell signalling chemical to said sewage,
- wherein the at least one CSC enhances the activity of aerobes, facultative anaerobes, anaerobic bacteria, or combinations thereof by modulating gene expression within a microbial cell or modulating communication signals between microbial cells or populations of microbial cells, and wherein the at least one CSC does not kill said bacteria.

40. The method according to claim 39 wherein the at least one CSC is selected from the group consisting of N-acyl homoserine lactones, Zeatin, 6-(-(γγ-dimethylallylamino)purine, 6-benzylamino-purine, kinetin, indole-3-acetic acid, and Rhodomine 123.

41. A method of resuscitating dormant microbes, or microbes that are in a starvation or stationary phase in sewage comprising:
- assessing at least one of volume, flow rate, Biochemical Oxygen Demand/Chemical Oxygen Demand loading, and bacterial composition of said sewage to determine a dosage of at least one cell signaling chemical (CSC); and
- adding the dosage of the at least one cell signalling chemical to said sewage, wherein the at least one CSC stimulates activity in the dormant, starved or stationary microbes by modulating gene expression within a microbial cell or modulating communication signals between microbial cells or populations of microbial cells, and wherein the at least one CSC does not kill said microbes.

42. The method according to claim 41 wherein the CSC is a furanone involved in cross talk with AHLs or peptide pheromones or mixtures thereof.

43. A method of controlling bacteria responsible for oxidation or reduction of nitrogenous compounds in sewage comprising:
- assessing at least one of volume, flow rate, Biochemical Oxygen Demand/Chemical Oxygen Demand loading, and bacterial composition of said sewage to determine a dosage of at least one cell signaling chemical (CSC); and
- adding the dosage of the at least one cell signalling chemical (CSC) to said sewage, wherein the at least one CSC regulates the activity of ammonia producing bacteria, nitrite producing bacteria, nitrous oxide producing bacteria, nitrate producing bacteria or denitrifying bacteria by modulating gene expression within a microbial cell or modulating communication signals between microbial cells or populations of microbial cells, and wherein said at least one CSC does not kill said bacteria.

44. The method according to claim 43 wherein the at least one CSC is selected from the group consisting of halogenated furanones, hydroxylated furanones, alkyl furanones, N-acyl homoserine lactones, peptide pheromones and mixtures thereof.

45. The method according to claim 43 wherein the at least one CSC is selected from the group consisting of 3-oxo-decanoyl homoserine lactone, butyryl homoserine lactone and mixtures thereof.

46. A method of reducing microbial activity in a sewerage catchment network comprising:
- assessing at least one of volume, flow rate, Biochemical Oxygen Demand/Chemical Oxygen Demand loading, and bacterial composition of sewage in said sewerage catchment network to determine a dosage of at least one cell signaling chemical (CSC); and
- adding the dosage of the at least one cell signalling chemical to said sewage,
- wherein adding the at least one CSC to a sewerage catchment network down-regulates microbial activity of aerobic bacteria, facultative anaerobic bacteria, anaerobic bacteria, or combinations thereof in sewage by modulating gene expression within a microbial cell or modulating communication signals between microbial cells or populations of microbial cells, and wherein the at least one CSC does not kill said bacteria.

* * * * *